US007908225B1

(12) United States Patent
Bigus et al.

(10) Patent No.: US 7,908,225 B1
(45) Date of Patent: Mar. 15, 2011

(54) INTELLIGENT AGENT WITH NEGOTIATION CAPABILITY AND METHOD OF NEGOTIATION THEREWITH

(75) Inventors: Joseph Phillip Bigus, Rochester, MN (US); Brian John Cragun, Rochester, MN (US); Helen Roxlo Delp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,833

(22) Filed: Nov. 2, 1999

Related U.S. Application Data

(62) Division of application No. 08/821,935, filed on Mar. 21, 1997, now Pat. No. 6,401,080.

(51) Int. Cl.
*G06Q 99/00* (2006.01)
(52) U.S. Cl. .......................................................... 705/76
(58) Field of Classification Search .................. 705/80, 705/76; 706/46, 16, 10; 376/264
See application file for complete search history.

(56) References Cited

U.S. PATENT DOCUMENTS

| 4,881,263 | A | 11/1989 | Herbison et al. ............... 380/21 |
|---|---|---|---|
| 4,914,585 | A | 4/1990 | Packard et al. ............... 364/200 |
| 5,073,890 | A | 12/1991 | Danielsen ................... 370/58.2 |
| 5,093,914 | A | 3/1992 | Coplien et al. ............... 395/700 |
| 5,117,496 | A | 5/1992 | Stearns et al. ............... 395/700 |
| 5,155,763 | A | 10/1992 | Bigus et al. .................. 379/113 |
| 5,226,176 | A | 7/1993 | Westaway et al. ............ 395/800 |
| 5,235,642 | A | 8/1993 | Wobber et al. ................ 380/25 |
| 5,241,621 | A | 8/1993 | Smart ............................ 395/51 |
| 5,276,768 | A | 1/1994 | Bander .......................... 395/10 |
| 5,301,320 | A | 4/1994 | McAtee et al. ............... 395/650 |
| 5,317,688 | A | 5/1994 | Watson et al. ................ 395/161 |
| 5,325,528 | A | 6/1994 | Klein ............................. 395/650 |
| 5,329,626 | A | 7/1994 | Klein et al. .................... 395/375 |
| 5,355,444 | A | 10/1994 | Chirico .......................... 395/51 |

(Continued)

FOREIGN PATENT DOCUMENTS

CA 2061117 2/1992

(Continued)

OTHER PUBLICATIONS

Gilbert et al., "IBM Intelligent Agents", http://www.networking.ibm.com/iag/iagwp1.html, (1996).

(Continued)

*Primary Examiner* — Andrew J. Fischer
*Assistant Examiner* — Jacob C. Coppola
(74) *Attorney, Agent, or Firm* — Wood, Herron & Evans, LLP

(57) ABSTRACT

An intelligent agent and method of negotiating therewith incorporate a number of features, used alone or in combination, to enhance the productivity, security, efficiency and responsiveness of the agent in negotiations with other parties. One feature incorporates randomization of one or more aspects of an agent's behavior to disguise its negotiation strategy from other negotiating parties and thereby prevent such parties from gaining a negotiating advantage at the expense of the agent. Another features incorporates limiting unproductive negotiations by constraining one or more aspects of an agent's behavior based upon the behavior of a negotiating party and/or the duration of the transaction, and thereby making it more likely that unproductive negotiations will be terminated. An additional feature incorporates dynamic value determination to determine the desired value of a desired transaction by weighting and normalizing estimated values retrieved from a plurality of information sources. Moreover, a further features incorporates dynamic value determination which weights and normalizes the values of related transactions based upon the proximity of the related and desired transactions.

12 Claims, 11 Drawing Sheets

U.S. PATENT DOCUMENTS

| | | | |
|---|---|---|---|
| 5,367,454 A | 11/1994 | Kawamoto et al. | 364/419.2 |
| 5,367,635 A | 11/1994 | Bauer et al. | 395/200 |
| 5,371,889 A | 12/1994 | Klein | 395/650 |
| 5,392,345 A | 2/1995 | Otto | 379/265 |
| 5,398,012 A | 3/1995 | Derby et al. | 340/825.03 |
| 5,408,470 A | 4/1995 | Rothrock et al. | 370/62 |
| 5,421,013 A | 5/1995 | Smith | 395/650 |
| 5,423,043 A | 6/1995 | Fitzpatrick et al. | 395/700 |
| 5,455,890 A | 10/1995 | Wang | |
| 5,465,286 A | 11/1995 | Clare et al. | 379/34 |
| 5,465,308 A | 11/1995 | Hutcheson et al. | 382/159 |
| 5,469,562 A | 11/1995 | Saether | 395/182.18 |
| 5,481,699 A | 1/1996 | Saether | 395/182.13 |
| 5,481,715 A | 1/1996 | Hamilton et al. | 395/700 |
| 5,553,145 A * | 9/1996 | Micali | 705/80 |
| 5,603,031 A | 2/1997 | White et al. | 395/683 |
| 5,613,012 A * | 3/1997 | Hoffman et al. | 382/115 |
| 5,644,727 A | 7/1997 | Atkins | 395/240 |
| 5,646,998 A | 7/1997 | Stambler | 380/25 |
| 5,655,081 A | 8/1997 | Bonnell et al. | 395/200.32 |
| 5,689,652 A | 11/1997 | Lupien et al. | 395/237 |
| 5,696,828 A | 12/1997 | Koopman, Jr. | 380/46 |
| 5,704,017 A * | 12/1997 | Heckerman et al. | 706/12 |
| 5,715,312 A | 2/1998 | Ijtsma | 380/3 |
| 5,715,403 A * | 2/1998 | Stefik | 705/44 |
| 5,717,989 A | 2/1998 | Tozzoli et al. | 705/37 |
| 5,729,472 A | 3/1998 | Seiffert et al. | 364/550 |
| 5,748,738 A * | 5/1998 | Bisbee et al. | 713/176 |
| 5,761,663 A | 6/1998 | Lagarde et al. | 707/10 |
| 5,765,028 A | 6/1998 | Gladden | 395/11 |
| 5,790,789 A | 8/1998 | Suarez | 395/200.32 |
| 5,905,495 A * | 5/1999 | Tanaka et al. | 713/201 |
| 5,910,987 A * | 6/1999 | Ginter et al. | 705/52 |
| 5,933,647 A | 8/1999 | Aronberg et al. | |
| 5,983,200 A * | 11/1999 | Slotznick | 705/26 |
| 6,021,437 A | 2/2000 | Chen et al. | |
| 6,023,586 A | 2/2000 | Gaisford et al. | |
| 6,049,819 A | 4/2000 | Buckle et al. | |
| 6,061,792 A * | 5/2000 | Simon | 705/76 |
| 6,085,178 A * | 7/2000 | Bigus et al. | 705/50 |
| 6,147,977 A * | 11/2000 | Thro et al. | 370/264 |
| 6,148,067 A * | 11/2000 | Leipow | 379/201.01 |
| 6,192,354 B1 * | 2/2001 | Bigus et al. | 706/10 |
| 6,282,701 B1 | 8/2001 | Wygodny et al. | |
| 6,301,612 B1 * | 10/2001 | Selitrennikoff et al. | 709/220 |
| 6,345,264 B1 * | 2/2002 | Breese et al. | 706/21 |
| 2003/0084010 A1 | 5/2003 | Bigus et al. | |
| 2004/0059929 A1 | 3/2004 | Rodgers et al. | |

FOREIGN PATENT DOCUMENTS

| | | |
|---|---|---|
| EP | 0519109 A1 | 12/1992 |
| EP | 0589249 A2 | 3/1994 |
| EP | 0598534 A1 | 5/1994 |
| EP | 0611210 A1 | 8/1994 |
| JP | 3195141 | 8/1991 |
| JP | 4157944 | 5/1992 |
| JP | 04-360237 | 12/1992 |
| JP | 4360237 | 12/1992 |
| JP | 5035481 | 2/1993 |
| JP | 6175944 | 6/1994 |
| JP | 07-200300 | 8/1995 |
| WO | WO9321586 | 10/1993 |
| WO | WO9500907 | 1/1995 |
| WO | WO9502217 | 1/1995 |
| WO | WO9511560 | 4/1995 |
| WO | WO9515635 | 6/1995 |
| WO | WO 97/08640 | 3/1997 |

OTHER PUBLICATIONS

"Commercial Expert-System Shells", http://www.ioe.ac.uk/hgm/expert3.html, (1997).

"Commercial Software Packages for Neural Network Simulation", ftp://ftp.sas.com/pub/neural/FAQ6.html, (1997).

A.D. Kwok et al., "A Development System for Intelligent Agent Manufacturing Software" *Integrated Manufacturing Systems*, 1994, vol. 5 No. 4/5, pp. 64-76.

Barbara Hayes-Roth, "An architecture for adaptive intelligent systems", *Artificial Intelligence*, Jan. 1995, vol. 72, Nos. 1-2, pp. 329-365.

Siegfried R. Bocionek, "Agent systems that negotiate and learn", *International Journal of Human-Computer Studies*, Mar. 1995, vol. 42, No. 3, pp. 265-288.

Darrell Woelk et al., "Uncovering the next generation of active objects", *OBJECT magazine*, Jul./Aug. 1995, pp. 32-40.

Jan Ozer, "Totally Streaming Multimedia", *CD-ROM Professional*, Aug. 1996, vol. 9 No. 8, pp. 54-66.

Barbara Hayes-Roth et al., "A Domain-Specific Software Architecture for Adaptive Intelligent Systems", *IEEE Transactions on Software Engineering*, Apr. 1995, vol. 21, No. 4, pp. 288-301.

Glenn R. Stearns, "Agents and the HP NewWave Application Program Interface", *Hewlett-Packard Journal*, Aug. 1989, pp. 32-37.

T.J. Grant, "A review of Multi-Agent Systems techniques, with application to Columbus User Support Organisation", *Future Generation Computer Systems*, May 1992, vol. 7, No. 4, pp. 413-437.

Mufit Ozden, "Intelligent Objects in Simulation", *ORSA Journal on Computing*, Fall 1994, vol. 6, No. 4, pp. 329-341.

Peter Gibbons et al., "Intelligent Agents in Multi-Media Systems", *Sharp Technical Journal*, Dec. 1994, vol. 60, pp. 11-14.

Cristano Castelfranchi, "Guarantees for Autonomy in Cognitive Agent Architecture" *Proceedings of ECAI-94 Workshop on Agent Theories, Architectures, and Languages*, Amsterdam, The Netherlands, Aug. 8-9, 1994, pp. 56-70.

Devindra Weerasooriya et al., "Design of a Concurrent Agent-Oriented Language", *Proceedings of ECAI-94 Workshop on Agent Theories, Architectures, and Languages*, Amsterdam, The Netherlands, Aug. 8-9, 1994, pp. 386-401.

Agostino Poggi, "DAISY: an Object-Oriented System for Distributed Artificial Intelligence", *Proceedings of ECAI-94 Workshop on Agent Theories, Architectures, and Languages*, Amsterdam, The Netherlands, Aug. 8-9, 1994, pp. 341-354.

David Kinny et al., "Planned Team Activity" *4th European Workshop on Modelling Autonomous Agents in a Multi-Agent World*, MAAMAW '92, S. Martino al Cimino, Italy, Jul. 29-31, 1992, pp. 227-256.

Stephen Marsh, "Trust in Distributed Artificial Intelligence" *4th European Workshop on Modelling Autonomous Agents in a Multi-Agent World*, MAAMAW '92, S. Martino al Cimino, Italy, Jul. 29-31, 1992, pp. 94-112.

Beerud Sheth et al., "Evolving Agents for Personalized Information Filtering", *Proceedings of the Ninth Conference on Artificial Intelligence for Applications*, Orlando, Florida, Mar. 1-5, 1993, pp. 345-352.

Tremaine A.O. Cornish et al., "What Has Mill to Say about Data Mining", *Proceedings of The 11th Conference on Artificial Intelligence for Applications*, Los Angeles, California, Feb. 20-23, 1995, pp. 347-353.

Siegfried Bocionek, "Software Secretaries: Learning and Negotiating Personal Assistants for the Daily Office Work", *Proceedings of IEEE Int'l. Conf. on Systems, Man and Cybernetics*, San Antonio, Texas, Oct. 2-5, 1994, vol. 1, pp. 7-12.

Enrique D. Espinosa, "Intelligent Classroom Information Agent Multimedia Lab & Visual Guides for Datastructures II", *Proceedings of the Int'l. Conf. on Multimedia Computing and Systems*, Washington, D.C., May 15-18, 1995, pp. 302-305.

Rolf Pfeifer et al., "Distributed Adaptive Control: A Paradigm for Designing Autonomous Agents", Toward a Practice of Autonomous Systems, *Proceedings of the First European Conf. on Artificial Life*, Paris, France, Dec. 1991, pp. 21-30.

Alison Cawsey et al., "A Comparison of Architectures for Autonomous Multi-Agent Communication", *Proceedings of the 10th European Conference on Artificial Intelligence*, Vienna, Austria, Aug. 3-7, 1992, pp. 249-251.

Paul Kearney et al., "Emergent Behaviour in a Multi-Agent Economic Situation" *Proceedings of the 11th European Conference on Artificial Intelligence*, Amsterdam, The Netherlands, Aug. 8-12, 1994, pp. 284-288.

Wayne Wobcke, Reasoning about Action from the Perspective of Situation Semantics, *Proceedings of the 6th Australian Joint Conference on Artificial Intellingence*, Melbourne, Australia, Nov. 16-19, 1993, pp. 71-76.

Gunilla A. Sundstrom et al., "Cooperative Human-Computer Decision Making: An Experiment and Some Implications", *Proceedings of the Human Factors and Ergonomics Society 38th Annual Meeting*, Nashville, Tennessee, Oct. 24-28, 1994, pp. 220-224.

T. Moody, "AT&T Personalink (SM)—A Public Network for Smart Agent Pics", *IEE Colloquium on Roaming with Data*, London, UK, Mar. 6, 1995, Digest No. 1995-046.

Lech Polkowski et al., "Introducing Rough Mereological Controllers: Rough Quality Control", *Proceedings of RSSC '94 3rd Int'l. Workshop on Rough Sets and Soft Computing*, San Jose, California, Nov. 10-12, 1994.

Terence J. Parr et al., "A Language for Creating and Manipulating VRML", *Symposium on the VRML '95*, San Jose, California, Dec. 14-15, 1995, pp. 123-131.

Joseph P. Bigus, *Data Mining with Neural Networks*, McGraw-Hill Publishing Company, 1996.

David M. Chess, "Security Considerations in Agent-Based Systems",*For the 1st Annual Conference on Emerging Technologies and Applications in Communications*, Portland, Oregon, May 7-10, 1996.

Tuomas Sandholm et al. "Issues in Automated Negotiation and Electronic Commerce: Extending the Contract Net Framework", First International Conference on Multi-Agent Systems, (Jun. 1995), pp. 328-335.

Ted Selker, "Coach: A Teaching Agent that Learns", *Communications of the Association for Computing Machinery*, vol. 37, No. 7, (Jul. 1996), pp. 92-99.

Gregory E. Kersten et al., "Negotiation in Distributed Artificial Intelligence: Drawing from Human Experience", *Proceedings of the Twenty-Seventh Annual Hawaii International Conference on System Sciences*, (1994), pp. 258-270.

Jim R. Oliver, "On Artificial Agents for Negotiation in Electronic Commerce", *Proceedings of the 29th Annual Hawaii International Conference on System Sciences*, (1996), pp. 337-346.

Edward A. Billard, "Effects of Group Size on Goad-Directed Agents in Distributed Environments", IEEE Publication No. 0-2803-2559-1/95 (1995), pp. 3403-3408.

Database 636 (IAC Newsletter) on Dialog, No. 3263922, "General Magic attempts to pull Glory from Web Hat", Network Briefing, (Jul. 19, 1996), 2 pages.

Database 148 (IAC Trade & Industry Database), No. 4056305, Katy Ring, "Neural Networks, knowledge systems, genetic algorithms at Cambridge Consultants", Computergram International, (Jul. 17, 1989), 3 pages.

Koza, John R., *Genetic Programming: On the Programming of Computers By Means of Natural Selection*, The MIT Press, 1992.

Maes, Pattie, *Software Agents*, MIT Media Lab Slides 1, 3, 5-9, 13, 15-16, 18, 20, 22-26, 35-37, 42, 47-52, 54-56, 58-67, 71, 77, 80-82, 86, 101-102, 133, 136, and 144, presented in Chicago, 1997, displayed at http://pattie.www.media.mit.edu/people/pattie/CHI97, downloaded Sep. 21, 1999.

Giorgios, Zacharia and Maes, Pattie, *MIT Media Lab: Software Agents Group: Proiects*, Website: http//agents.www.media.mit.edu/groups/agents/projects/, 1997 downloaded Sep. 21, 1999, 5 pages.

Chavez, A. and Maes, P., "Kasbah: An Agent Marketplace for Buying and Selling Goods", *Proceedings of the First International Conference on the Practical Application of Intelligent Agents and Multi-Agent Technology*, Blackpool, U.K.: Practical Application Company, (Apr. 1996), pp. 75-90.

Bruce Schneier, *Applied Cryptography, Second Edition: Protocols, Algorithms, and Source Code in C*, John Wiley & Sons, Inc. (1996), pp. v-xiv and 1-10.

Kahn, David, *The Codebreakers: The Story of Secret Writing*, New York: Scribner, (1996), pp. 224-229.

H. Nwana et al., "An Introduction to Agent Technology," BT Technology Journal, vol. 14, No. 4, pp. 55-67, Oct. 1996.

A. Rasmusson et al., "Personal Security Assistance for Secure Internet Commerce," New Security Paradigm '96 Workshop, On-Line. pp. 1-12, Sep. 16, 1996.

W. Farmer et al., "Security for Mobile Agents: Issues and Requirements." Proceedings of the 19th National Information Systems Security Conference, On-Line, pp. 1-7, 1996.

F. Hohl, "An Approach to Solve the Problem of Malicious Hosts in Mobile Agent Systems," Universitat Stuttgart, Falcultat Informatik, Bericht Nr. Mar. 1997, On-Line, pp. 1-13, Mar. 1, 1997.

D. Johansen et al., "Operating System Support for Mobile Agents," Workshop on Hot Topics in Operating Systems, pp. 42-45, 1995.

A. Mensch et al., "REAKT: Real-time Architecture for Time-critical Knowledge-based Systems," Intelligent Systems Engineering, pp. 143-167, Autumn 1994.

A. Reinhardt, "The Network with Smarts," 4465 Byte, McGraw-Hill, Inc., Peterborough, NH, US, vol. 19, No. 10, pp. 51-64, Oct. 1994.

Mitchell, Melanie, "Chapter 3: Genetic Algorithms in Scientific Models", *An Introduction to Genetic Algorithms*, The MIT Press, Cambridge, MA, (1996), pp. 85-108.

Müller, Jürgen, *Defining Rational Agents by Using Hierarchical Structured Knowledge Bases*, IEEE Colloquium on Intelligent Agents, (1991), pp. 8/1-8/3.

Zhang, Tianning et al., *Intelligent Agents in Network and Service Management*, IEEE Global Telecommunication Conference, (Nov. 1996), pp. 1855-1861.

Murray, John et al., *Modeling a Distributed Human-Machine System using Knowledge Engineering Techniques*, IEEE Proceedings of Third Annual Symposium on Human Interaction with Complex Systems, (Aug. 1996), pp. 235-242.

Teysuya Uchiki, "Price Forming Simulation in Electrical Market", Information Processing Society Memoir, vol. 95, No. 105 (95-AI-102), pp. 1-6, Faculty of Business Administration, Toyo University.

T. Uchiki, "Price Forming Simulation in Electrical Market," Study Report of Information Processing Associate, vol. 95, No. 105, 95-AI-102.

T. Uchiki, "An Experiment for Emergence of Trading Behaviors in Double Auction Market Using Genetic Algorithm," Study Report of Information Processing Associate, vol. 96, No. 105, 96-AI-106.

Kopelman, "Accelerated Engineering, The 3 Secrets to Just-In-Time Product Development (JITPD)," WESCON/94, Idea/Microelectronics, Conference Record; Sep. 27-29, 1994; pp. 362-367.

Stidolph, "Evolutionary Design of Complex Software (EDCS) Demonstration Days 1999," ACM SIGSOFT Engineering Notes; vol. 25, No. 1; Jan. 2000.

Purssell, "The Product Release Interface: Environment and Concerns," Fifth Electronic Manufacturing Technology Symposium International "Design-to-Manufacturing Transfer Cycle," Oct. 10-12, 1998, pp. 51-56.

Manderson, 'Satellite Systems: How to Distribute Data, Computing, Consulting, and Responsibility All at the Same Time, Proceedings of the 17th Annual ACM SIGUCCS Conference on User Services; Oct. 1989.

Hoff, et al., "The Open Software Description Format (OSD)" Aug. 11, 1997 W3C.

\* cited by examiner

INTELLIGENT AGENT WITH NEGOTIATION CAPABILITY AND METHOD OF NEGOTIATION THEREWITH

This application is a divisional application of U.S. Ser. No. 08/821,935, filed on Mar. 21, 1997 by Bigus et al., entitled "INTELLIGENT AGENT WITH NEGOTIATION CAPABILITY AND METHOD OF NEGOTIATION THEREWITH," (issued as U.S. Pat. No. 6,401,080). This application is also related to the following U.S. patent applications, all of which were filed by Bigus et al.: U.S. Ser. No. 08/822,119 filed on Mar. 21, 1997 and entitled "APPARATUS AND METHOD FOR COMMUNICATING BETWEEN AN INTELLIGENT AGENT AND CLIENT COMPUTER PROCESS USING DISGUISED MESSAGES," (issued as U.S. Pat. No. 6,085,178); U.S. Ser. No. 08/826,107 filed on Mar. 21, 1997 and entitled "APPARATUS AND METHOD FOR OPTIMIZING THE PERFORMANCE OF COMPUTER TASKS USING MULTIPLE INTELLIGENT AGENTS HAVING VARIED DEGREES OF DOMAIN KNOWLEDGE," (issued as U.S. Pat. No. 6,192,354); and U.S. Ser. No. 09/100,595, filed on Jun. 19, 1998 and entitled "OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE" (which is a divisional of U.S. Ser. No. 08/822,993 filed on Mar. 21, 1997 and entitled "APPARATUS AND METHOD FOR OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE" (now abandoned)). The disclosures of all of these applications are hereby incorporated by reference herein.

FIELD OF THE INVENTION

The invention is generally related to intelligent agent computer programs executable on computer systems and the like, and in particular, the use of such programs in commercial transactions.

BACKGROUND OF THE INVENTION

Since the advent of the first electronic computers in the 1940's, computers have continued to handle a greater variety of increasingly complex tasks. Advances in semiconductors and other hardware components have evolved to the point that current low-end desktop computers can now handle tasks that once required roomfuls of computers.

Computer programs, which are essentially the sets of instructions that control the operation of a computer to perform tasks, have also grown increasingly complex and powerful. While early computer programs were limited to performing only basic mathematical calculations, current computer programs handle complex tasks such as voice and image recognition, predictive analysis and forecasting, multimedia presentation, and other tasks that are too numerous to mention.

However, one common characteristic of many computer programs is that the programs are typically limited to performing tasks in response to specific commands issued by an operator or user. A user therefore must often know the specific controls, commands, etc. required to perform specific tasks. As computer programs become more complex and feature rich, users are called upon to learn and understand more and more about the programs to take advantage of the improved functionality.

In addition to being more powerful, computers have also become more interconnected through private networks such as local area networks and wide area networks, and through public networks such as the Internet. This enables computers and their users to interact and share information with one another on a global scale. However, the amount of information is increasing at an exponential rate, which makes it increasingly difficult for users to find specific information.

As a result of the dramatic increases in the both complexity of computer programs and the amount of information available to users, substantial interest has developed in the area of intelligent agent computer programs, also referred to as intelligent agents or simply agents, that operate much like software-implemented "assistants" to automate and simplify certain tasks in a way that hides their complexity from the user. With agents, a user may be able to perform tasks without having to know specific sequences of commands. Similarly, a user may be able to obtain information without having to know exactly how or where to search for the information.

Intelligent agents are characterized by the concept of delegation, where a user, or client, entrusts the agents to handle tasks with at least a certain degree of autonomy. Intelligent agents operate with varying degrees of constraints depending upon the amount of autonomy that is delegated to them by the user.

Intelligent agents may also have differing capabilities in terms of intelligence, mobility, agency, and user interface. Intelligence is generally the amount of reasoning and decision making that an agent possesses. This intelligence can be as simple as following a predefined set of rules, or as complex as learning and adapting based upon a user's objectives and the agent's available resources.

Mobility is the ability to be passed through a network and execute on different computer systems. That is, some agents may be designed to stay on one computer system and may never be passed to different machines, while other agents may be mobile in the sense that they are designed to be passed from computer to computer while performing tasks at different stops along the way. User interface defines how an agent interacts with a user, if at all.

Agents have a number of uses in a wide variety of applications, including systems and network management, mobile access and management, information access and management, collaboration, messaging, workflow and administrative management, and adaptive user interfaces. Another important use for agents is in electronic commerce, where an agent may be configured to seek out other parties such as other users, computer systems and agents, conduct negotiations on behalf of their client, and enter into commercial transactions.

Just as human agents have a certain amount of autonomy, intelligent agents similarly have a set of constraints on what they are authorized and not authorized to do. For example, a selling agent for electronic commerce applications may be constrained by a minimum acceptable price. However, a good selling agent, whether electronic or human, would never initially give its lowest acceptable price, as this would minimize profit margins. Furthermore, giving the lowest price may not even assure sales because a buyer may infer that the price is not competitive because the agent is unwilling to lower the price from the original offer. Therefore, an agent typically starts negotiations with some margin from its worst case acceptable price, then works toward a mutually acceptable price with the other party.

It is desirable for all agents, and particularly those in electronic commerce applications, to operate reliably, efficiently, and profitably on behalf of their clients. Any negotiation plans, techniques or strategies used by an intelligent agent to operate within its constraints, however, often should be hidden from other parties. Otherwise, the agent is placed at a competitive disadvantage. Given that many agents may be dispatched to unsecured environments, an assumption must be made that other parties may be able to scan or reverse engineer an agent to learn its negotiation strategy or other constraints. It must also be assumed that other parties may be able to decode messages sent between an agent and its client to obtain the greatest advantage in negotiation. The validity of such assumptions stems from the fact that these techniques are conceptually similar to many of the techniques used by some salespeople to obtain the best price possible.

If a selling agent uses a predictable algorithm to make offers, e.g., starting with a comfortable margin and halving the difference between the previous asked price and its lowest price with each new asked price, the other party may be able to detect this trend and predict the lowest price acceptable to the agent. Under these circumstances, the selling agent would rarely be able to negotiate a price higher than its minimum acceptable price.

Another desirable trait for intelligent agents is that of efficiency. In electronic commerce applications especially it is often desirable to maximize the number of trades at the best prices for the client. Any time that an intelligent agent spends in fruitless negotiations decreases the efficiency of the agent.

Furthermore, another concern with intelligent agents arises when the agents are interacting with unknown parties. For example, if agents interact with known, reliable agents, the relative risks to the agents may not be as great, and the agents may not be required to protect against adverse activities on the part of these parties. However, particularly in many unsecured environments, it is likely that the agents will interact with a number of unknown parties, which presents greater risks to the agents, and may require additional protections to be provided for the agent.

In addition, intelligent agents in electronic commerce applications must often be capable of determining a reasonable or acceptable value for a desired transaction. In many markets, especially those that are electronically controlled, market conditions can change rapidly. Stock, bond and commodity prices for example change continuously, and an agent which works with outdated information may enter into transactions that are well outside of the current market conditions at the time of the transactions. Moreover, some markets may be subject to manipulation by other parties attempting to obtain competitive advantages.

Therefore, a significant need exists in the art for an intelligent agent having productive, adaptive, secure and efficient negotiation skills for conducting commercial transactions on behalf of a client.

SUMMARY OF THE INVENTION

The invention addresses these and other problems associated with the prior art in providing an intelligent agent and method of negotiating therewith which utilizes one or more features, alone or in combination, to enhance the productivity, security, efficiency and responsiveness of the agent in negotiations with other parties.

Consistent with one aspect of the invention, the negotiation strategy of agents may be disguised from other negotiating parties to prevent such parties from gaining negotiating advantages at the expense of the agents. Such agents generate offers, wait for responses from negotiating parties, and determine based upon responses whether to complete transactions. A characteristic of at least one of the above steps may be randomized to make the agents' negotiation strategies less predictable, thereby limiting or even precluding negotiating parties from determining the agents' negotiation strategies therefrom.

Consistent with an additional aspect of the invention, the efficiency of some agents may be improved by limiting negotiations that are likely to be unproductive. Such agents generate offers, wait for responses from negotiating parties, and determine based upon the responses whether to complete transactions. Unproductive negotiations with such agents are limited by constraining a characteristic of at least one of the above steps based upon the behavior of the negotiating party and/or the duration of the transaction. Negotiations with suspect or uncooperative parties, or which are prolonged beyond acceptable durations, are more likely to be terminated, thereby often freeing up the agents to seek more productive negotiations elsewhere.

Consistent with another aspect of the invention, other parties with which an agent interacts may be identified, e.g., to modify the behavior of an intelligent agent depending upon a party with which the agent is interacting. Records of known parties may be maintained with one or more attributes associated therewith, so that upon interaction with an unknown party, the attributes therefor may be compared with those of the known parties to identify the unknown party as that known party for which the attributes most closely match. Identification of another party may have numerous benefits, including but not limited to being able to associate reliability ratings with given known parties so that the reliability of an unknown party may be determined.

Dynamic value determination may also be relied upon to generate a value for a desired transaction, e.g., for the purpose of assisting an agent in calculating offers or determining whether an offer from another party is within an acceptable range for the given goods or services that are the subject of a desired transaction. Consistent with a further aspect of the invention, the desired values of desired transactions may be dynamically determined at least in part by weighting estimated values from a plurality of information sources based upon a predetermined criteria to generate weighted estimated values, and normalizing the weighted values. By utilizing a plurality of information sources, an inherently more reliable value determination may be made for use by an agent in negotiations. Also, in many situations, manipulation of an agent's behavior by third parties may be minimized since value determinations are often not reliant on single sources of information.

Consistent with another aspect of the invention, the desired values of desired transactions may also be dynamically determined at least in part by weighting the values of related transactions based upon the proximity of the related transactions to the desired transactions, and then normalizing the weighted values. The proximity of related transactions may be determined by comparing one or more characteristics of the desired and related transactions such that related transactions that are more similar to the desired transaction are weighted more heavily in the determination of the desired value.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described illustrated embodiments of the invention.

DETAILED DESCRIPTION OF THE ILLUSTRATED EMBODIMENTS

Figure 1:
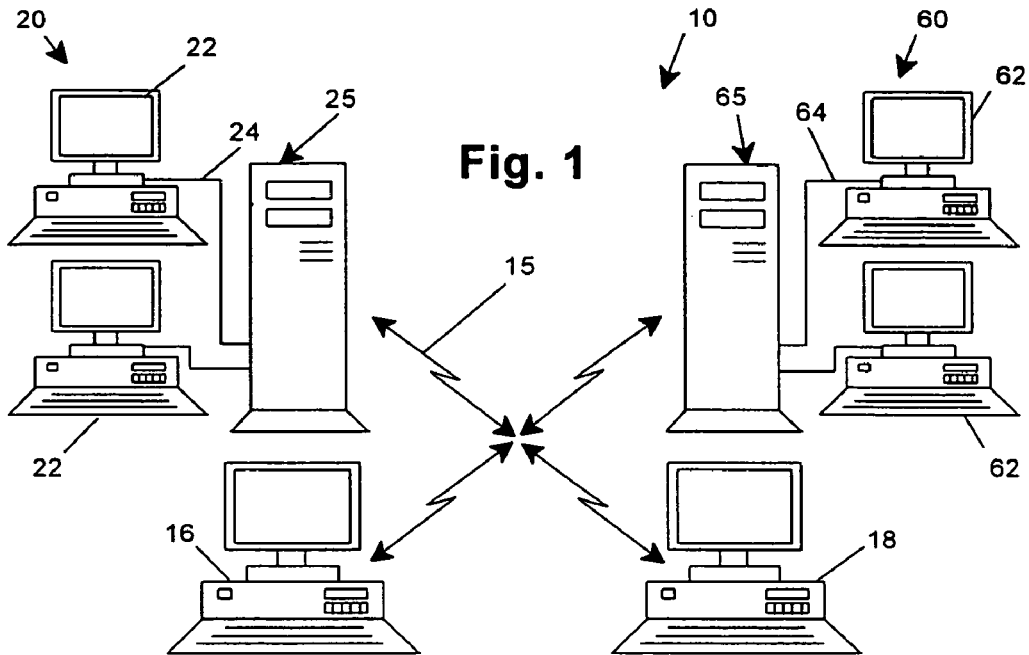
FIG. 1 is a block diagram of a networked computer system for use with the various embodiments of the invention.

Turning to the Drawing, wherein like parts are denoted by like numbers throughout the several views, FIG. 1 illustrates a networked computer system 10 for use with the illustrated embodiments of the invention. System 10, which is representative of many networked data processing systems, generally includes one or more computer systems, e.g., single-user computer systems 16, 18 and multi-user computer systems 20, 60, coupled through a network 15. Multi-user computer system 20 typically includes one or more servers 25 to which one or more single-user computers 22 may be networked through a separate network 24. Similarly, multi-user computer system 60 typically includes one or more servers 65 coupled to one or more single-user computer systems 62 through a network 64. Network 15 may represent any type of networked interconnection, including but not limited to local-area, wide-area, wireless, and public networks (e.g., the Internet).

Intelligent agents are computer programs which have been delegated a degree of autonomy but which are limited to operating within constraints defined by their client. A subset of such agents which are capable of being passed between and operating in different applications or computer systems are referred to as mobile agents.

Figure 2:
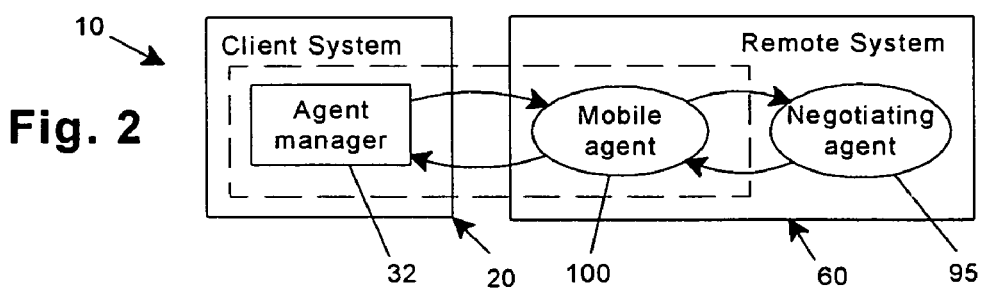
FIG. 2 is a block diagram of one embodiment of the networked computer system of FIG. 1, illustrating the interaction between intelligent agents therein.

It is anticipated that agents consistent with the invention may originate in and be resident from time to time on any of the above-mentioned computer systems. One possible distinction between the computer systems for the purposes of the invention may be whether each is a client or a remote system relative to a particular agent. For example, FIG. 2 illustrates an embodiment of computer system 10 where multi-user computer system 20 is a client system, and multi-user computer system 60 is a remote system.

A client system will hereinafter refer to a computer system that provides an agent a certain level of security from manipulation by other parties when the agent is resident on the system. The client system is also the computer system from which management of the agent is typically handled. The agent typically but not necessarily will also originate from the client system.

A remote system, on the other hand, will hereinafter refer to a computer system that is typically not capable of providing a desired level of security for an agent, generally because the computer system is not under the control of the client. It is typically while resident on a remote system that an agent runs the greatest risk of being scanned or reverse compiled, or of having communications intercepted or monitored, by other parties.

The various embodiments described herein have principal uses in electronic commerce applications, where agents are configured to negotiate commercial transactions, generally in the role of buying or selling agents. The agents may negotiate with other agents, other computer systems, or even other individuals. The agents may interact one-on-one, or may be capable of operating within a "market" of multiple agents, along the lines of a stock or commodity market. Computer systems having the ability to host agents for interaction therebetween include negotiating programs of varying sophistication and are hereinafter referred to as agent hosts.

For example, FIG. 2 illustrates a mobile intelligent agent 100 which communicates with an agent manager 32 in client system 20. During negotiation with another party such as negotiating agent 95, mobile agent 100 is resident on remote system 60. It should be appreciated that remote system 60 may be the client for agent 95, or may also be considered to be remote relative to this agent as well.

Figure 3:
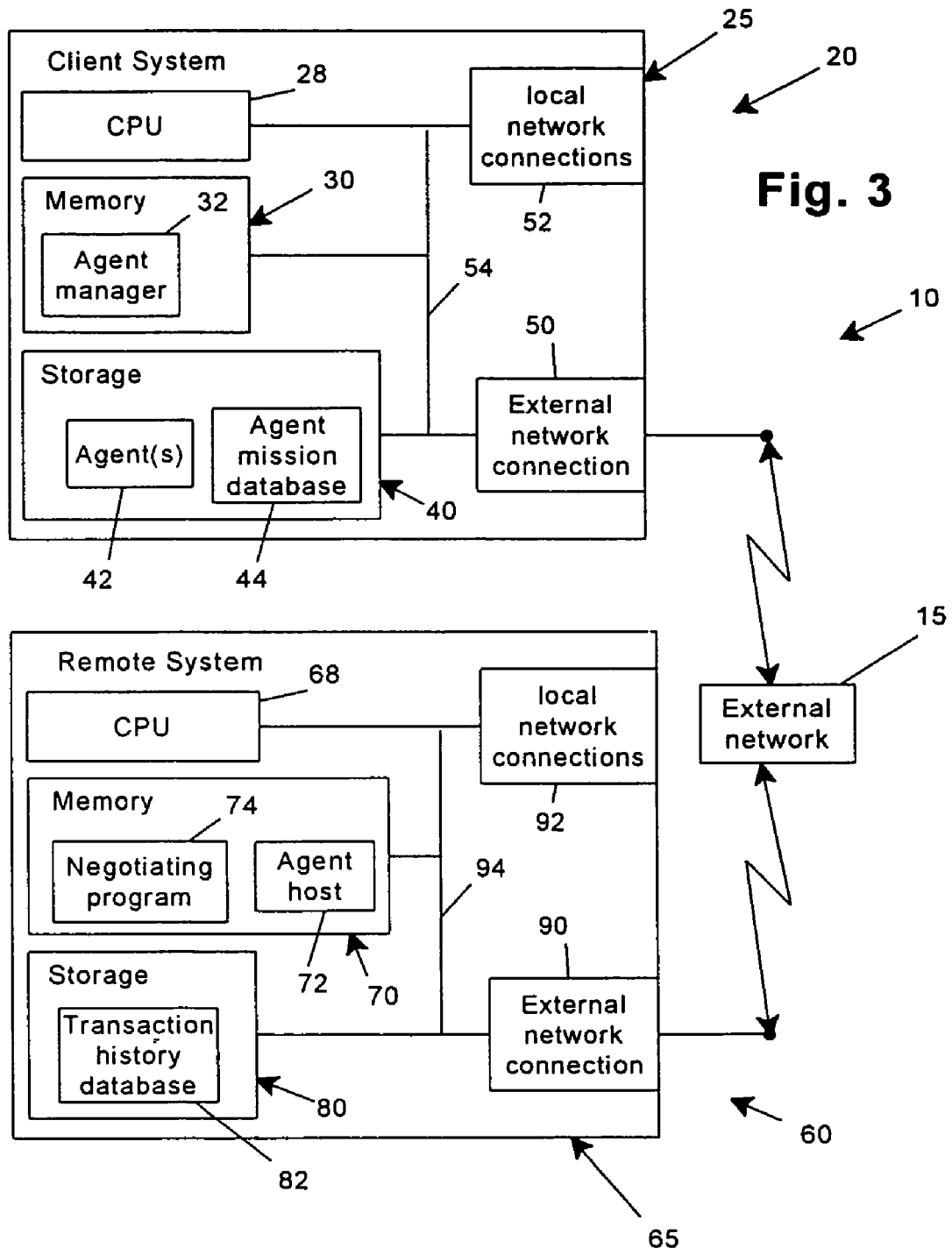
FIG. 3 is a block diagram of one embodiment of the networked computer system of FIG. 1, illustrating the primary components of the client and remote systems.

An exemplary functional design of networked computer system 10 for implementing the various embodiments of the invention is illustrated in FIG. 3. Server 25 of client system 20 generally includes a central processing unit (CPU) 28 coupled to a memory 30 and storage 40 over a bus 54. A local area network interface is provided at 52, and an interface to remote system 60 over external network 15 is provided through interface 50. Agent manager program 32 is resident in memory 30. Storage 40 includes one or more agents 42 (of which may include agent 100, for example), which are computer programs or modules that may be retrieved and used locally within system 20, or dispatched to remote systems to execute and perform tasks on behalf of the client system. Storage 40 also includes an agent mission database 44 which may track agent operations and the relative success or failure thereof.

Server 65 of remote system 60 also includes a CPU 68 coupled to a memory 70, storage 80, external network connection 90 and local network connection 92 over a bus 94. An agent host program 72 is resident in memory 70 to handle interactions between agents resident in the remote system. Typically, the agent host program is an asynchronous message/event driven environment that provides a common platform over which agent computer programs execute and interact, much like an operating system. The agent host is also capable of permitting messages to be sent between agents and their clients. Memory 70 also includes a negotiating program 74 which operates as the "other party" in transactions with agent 100, which may be another agent, a market or bulletin board application, or even an interface program through which an individual interacts with agent 100. Storage 80 maintains a transaction history database 82 which logs the transactions completed on the server.

Servers 25, 65 may be, for example, AS/400 midrange computers from International Business Machines Corporation. However, it should be appreciated that the hardware embodiments described herein are merely exemplary, and that a multitude of other hardware platforms and configurations may be used in the alternative.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as floppy disks, hard disk drives, and CD-ROM's, and transmission type media such as digital and analog communications links.

Figure 4:
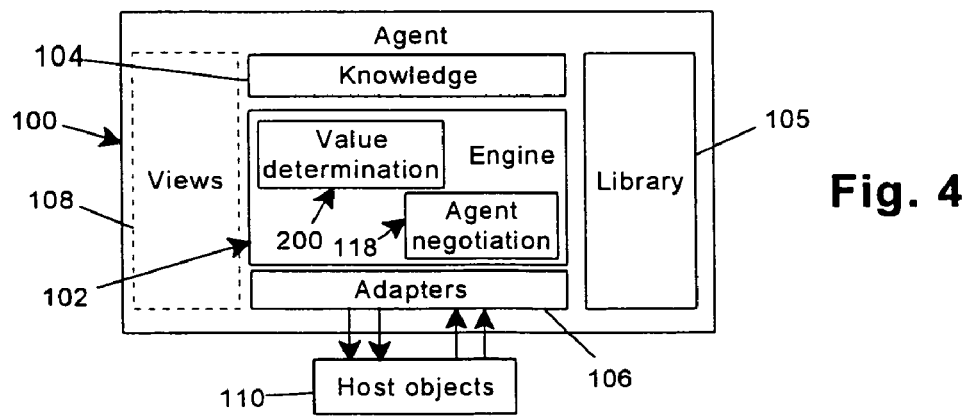
FIG. 4 is a block diagram of an intelligent agent consistent with the principles of the invention.

FIG. 4 illustrates agent 100 in greater detail. In general, any agent must have the ability to sense, recognize and act. Common with many agents, agent 100 includes a number of operational components, including an engine 102 which controls the overall operation of the agent and functions as the "brains" of the agent, a knowledge component 104 in which information is stored that is representative of the acquired knowledge of the agent, and an adapters component 106 through which the agent communicates with external objects (e.g., host objects 110) and through which the agent "senses" and interacts with its environment. A library component 105 persistently stores in one or more libraries or databases the information utilized by knowledge component 104, while an optional view component 108 provides the human interface, if any, for the agent, e.g., for supplying instructions to the agent.

It should be appreciated that all of the modules in agent 100 are typically provided within a single self-sufficient block or package of program code that permits the entire code for the agent to be transmitted to various locations and execute with a degree of autonomy from its client. Additional data or instructions may also be received by an agent from external sources, e.g., to supplement the library module as necessary. In addition, it should be appreciated that agent 100 may be implemented in practically any programming language, and is particularly well suited for object-oriented programming systems by virtue of its at least partially-autonomous operation. For example, agent 100 may be implemented as a Java package, which has a number of benefits for mobile program code by virtue of its platform-independence and run-time security.

As illustrated in FIG. 4, a number of modules or objects, including agent negotiation module 118 and value determination module 200, are incorporated into engine 102 to handle the negotiation functions for the agent. Module 118 generally implements the negotiation strategy for the agent, while routine 200 is utilized by module 118 to dynamically determine the value of a desired transaction. Each of these modules will be discussed separately herein.

It should be appreciated that other routines or objects necessary to implement the agent are also included in engine 102 but are not shown herein for ease of illustration. For example, functions such as initialization, communications, maintenance, finding other agents or markets to interact with, etc. may also be utilized. However, as these functions relate more to the basic operation of an agent, which is in general known in the art, these functions will not be discussed in any greater detail herein.

Moreover, additional functionality may be implemented by agent 100, e.g., disguising communications between an agent and agent manager, and disguising agent decision logic through the use of neural networking, as described in U.S. patent application Ser. No. 08/822,119 entitled "APPARATUS AND METHOD FOR COMMUNICATING BETWEEN AN INTELLIGENT AGENT AND CLIENT COMPUTER PROCESS USING DISGUISED MESSAGES", which has been incorporated by reference. Agent 100 may also be one of several agents having varying degrees of domain knowledge, or may have multiple modules with varying degrees of domain knowledge, so that the agent may be optimized for operation in different situations based upon an objective criteria (e.g., security concerns), as described in U.S. patent application Ser. Nos. 08/826,107 and 08/822,993 respectively entitled "APPARATUS AND METHOD FOR OPTIMIZING THE PERFORMANCE OF COMPUTER TASKS USING MULTIPLE INTELLIGENT AGENTS HAVING VARIED DEGREES OF DOMAIN KNOWLEDGE" and "APPARATUS AND METHOD FOR OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE", which have also been incorporated by reference.

Agent Negotiation

Agent negotiation with agent negotiation module 118 incorporates a number of separate features usable alone or together to improve the performance of an agent when conducting negotiations. First, one or more operating parameters of the agent may be randomized to an extent to reduce predictability and thus hinder the ability of other parties (e.g., other agents, computer programs, or individuals) to determine the negotiation strategy of the agent. Second, one or more operating parameters of the agent may be constrained to an extent to limit unproductive negotiations, typically based upon the duration of the negotiations and/or the behavior of the other parties to the negotiations. In addition, in some embodiments, these features, as well as other features discussed below, may obstruct attempts by other parties to manipulate the negotiations.

Figure 5:
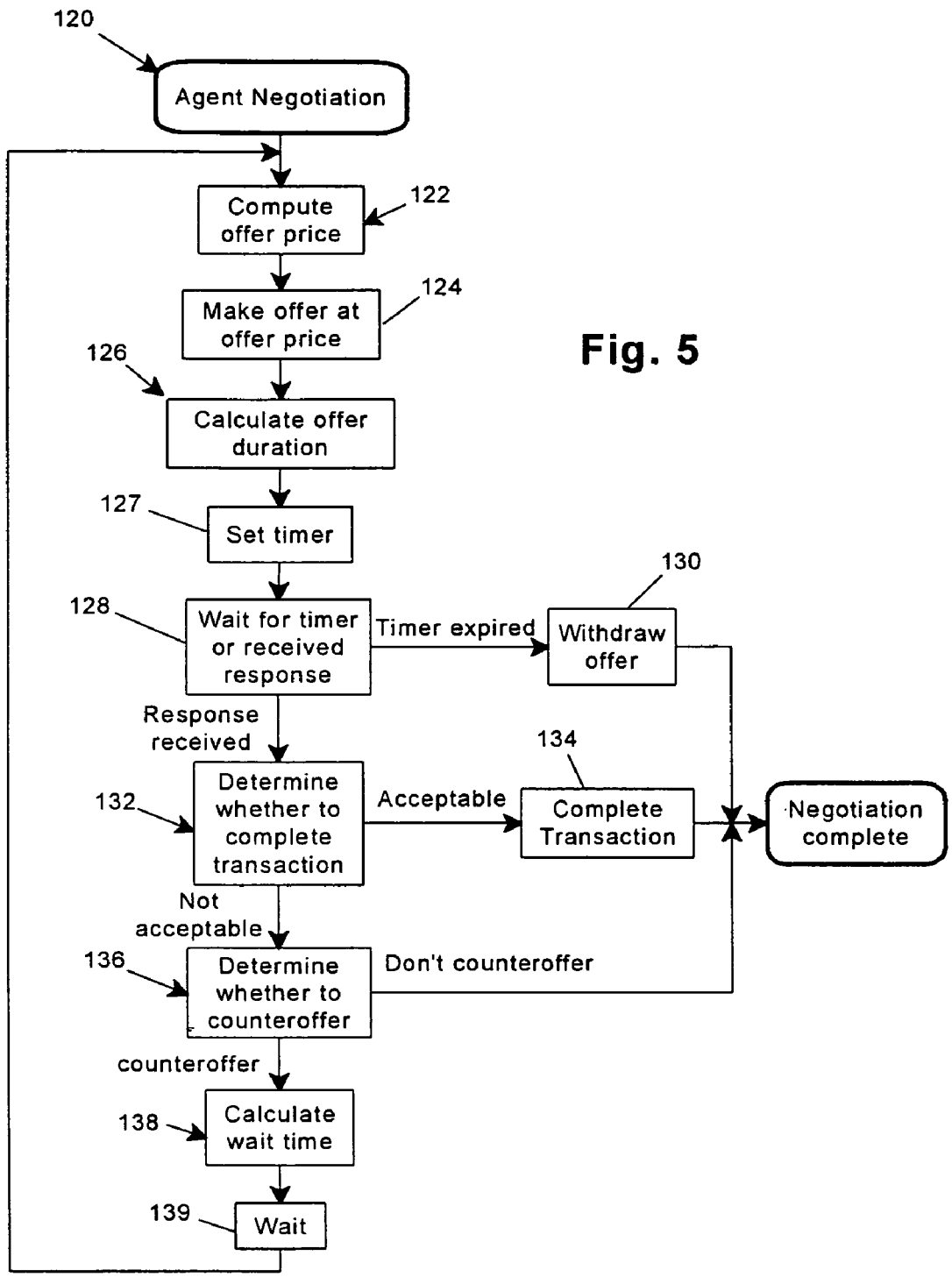
FIG. 5 is a flowchart illustrating the program flow of an agent negotiation routine consistent with the invention.

FIG. 5 illustrates an agent negotiation routine 120 which describes the operation of agent negotiation module 118 in greater detail. Routine 120 is generally called when agent 100 has found another party with which to negotiate, and the routine receives a desired transaction, typically from the agent manager in the client system. Routine 120 has been genericized for either a buying agent or a selling agent, with the distinctions in the routine for each type of agent pointed out below. In general, it should be appreciated that the negotiation strategies for buying and selling agents differ to the extent that a buying agent's goal is typically to achieve the lowest price possible, while the selling agent's goal is typically to achieve the highest price possible.

First, in block 122, a compute offer price block 122 is executed to generate an offer price for a desired transaction. Next, in block 124, an offer at the computed price is issued to another party (e.g., another agent, computer program such as a market, an individual, etc.), typically by sending a message.

It should be appreciated that agents typically operate asynchronously, whereby a response message from the other party, if any, may arrive at any time after the offer has been made. Thus, to prevent agent 100 from hanging up waiting for a response that may never arrive, an offer duration is calculated in block 126 and a timer is set in block 127 to fix the maximum time for agent 100 to wait for a response.

Next, in block 128, agent 100 waits for the first of the expiration of the timer or the receipt of a response message from the other party. It should be appreciated by those of skill in the art that while agent 100 waits for a response from the other party, the agent may suspend other operations, or may continue performing other operations during the offer duration period. For example, in one embodiment, receipt of a response or expiration of the timer may generate an interrupt which diverts execution of agent 100 to handle the either situation as appropriate. Also, in another embodiment, agent 100 may be multithreaded with a separate thread executing for each negotiation session, whereby each thread may be permitted to simply wait for a response until the timer expires without having to suspend the overall operations of the agent. Moreover, in other embodiments, received responses may be separately logged, with the agent checking for responses only periodically and/or upon expiration of the timer. It should also be appreciated that the offer duration may vary significantly for different applications. For example, in some applications, e.g., stock market transactions, offer durations as short as one or more computer cycles may be possible. In other applications, e.g., real estate transactions, offer durations may be as long as days, weeks, months or longer.

If no response is received within the duration of the offer, control passes to block 130 to withdraw the offer (if necessary) and complete or terminate the negotiation. An offer may be withdrawn by sending an appropriate message to the other party, removing the offer from a market situation (e.g., if a "bulletin board" of offers has been set up), or simply terminating the negotiation. A negotiation complete situation generally indicates that agent 100 is free to wait for other offers from other parties, or to seek out other parties with which to negotiate.

If a response message is received from the other party, control passes to block 132 to determine whether to complete the transaction (i.e., make a trade or "close a deal"). If the response message indicates an acceptable response, control passes to block 134 to complete the transaction, e.g., by sending an appropriate message to the other party, notifying an agent host of the transaction specifics, sending a message to the client requesting authorization or indicating that the transaction has been completed, etc.

If, however, an unacceptable response is received, control passes to block 136 to determine whether to counteroffer—that is, whether to continue negotiations. If it is determined that no counteroffer should be made, routine 120, and the negotiation with the other party, is complete. In addition, any messages to the other party, the agent host, and/or the client indicating the completion of negotiations may be made as required.

If a counteroffer is to be made, control passes to block 138 to calculate a wait time before which a counteroffer is to be made, then to block 139 to wait for the calculated period of time before returning control to block 122 to compute and issue a new offer, or counteroffer. In the alternative, no wait time may be utilized, resulting in an immediate counteroffer being issued.

It should be appreciated that agent 100 may conduct negotiations with more than one other party at a time, whereby the program flow similar to that shown in FIG. 5 would be executed for each negotiation session. Each negotiation session may be executed using a separate execution thread or other context switching mechanism.

As discussed above, one or more operating parameters of routine 120 are randomized and/or constrained to improve the negotiation performance of agent 100. In the illustrated embodiment of FIG. 5, the computation of the offer price in block 122, the calculation of the offer duration in block 126, the determination of whether to complete the transaction in block 132, the determination of whether to make a counteroffer in block 136, and the calculation of a wait time in block 138 are randomized to disguise negotiation strategy and/or are constrained to limit unproductive negotiations. It should be appreciated, however, that randomizing and/or constraining any of these operating parameters may be omitted, and that other operating parameters may be randomized and/or constrained consistent with the invention.

Figure 6:
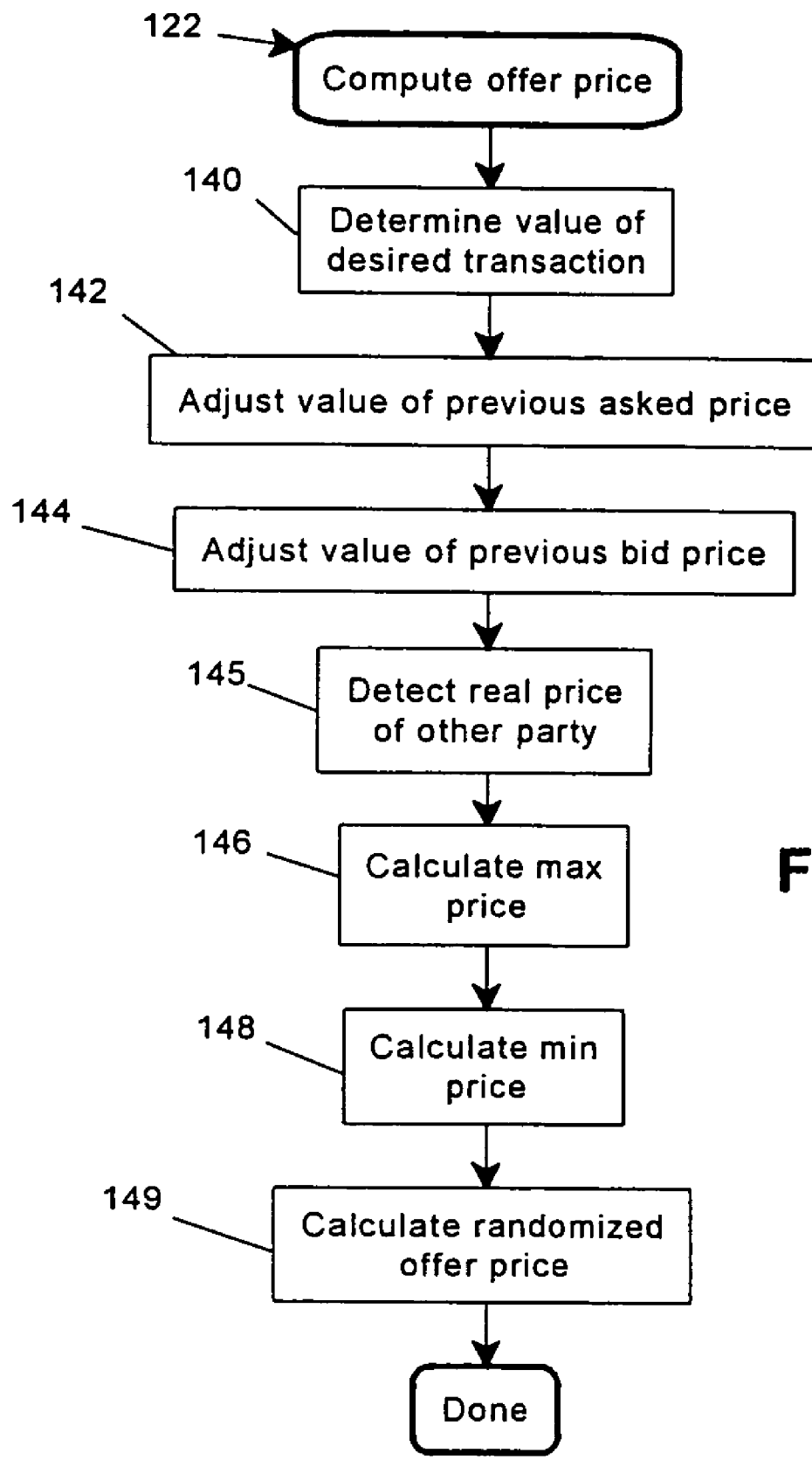
FIG. 6 is a flowchart illustrating the program flow of the compute offer price block in FIG. 5.

The steps performed in compute offer price block 122 are illustrated in greater detail in FIG. 6. Block 122 maintains a record of previous calculations of the value of the desired transaction, as well as previous asked (selling agent's) prices and previous bid (buying agent's) prices. These values are used to vary the agent's offer price for each subsequent counteroffer made by the agent.

First, block 140 determines the value (V) of the desired transaction, i.e., what the agent considers to be the actual value of the goods or services being purchased, or what the agent considers to be a "fair" price for its client. One suitable process for determining the value is performed in a value determination module 200 discussed in greater detail below in connection with FIGS. 11-13, although other processes may be used in the alternative.

Next, blocks 142 and 144 may be executed to adjust the previous asked (selling agent's) price and previous bid (buying agent's) price in view of any changes to the determined value of the desired transaction. Consequently, if agent 100 detects a significant change between the determined value for the current iteration and for a previous iteration, the values stored for the previous asked and bid prices may be adjusted accordingly to reflect the new value of the transaction. Therefore, for an iteration n of agent negotiation routine 120, blocks 142 and 144 may be represented as:

$$A_{n-1} = A_{n-1,old} + (V_n - V_{n-1})$$

$$B_{n-1} = B_{n-1,old} + (V_n - V_{n-1})$$

where $A_{n-1}$ is the previous asked price after adjustment, $B_{n-1}$ is the previous bid price after adjustment, $A_{n-1,old}$ is the previous asked price prior to adjustment, $B_{n-1,old}$ is the previous bid price prior to adjustment, $V_n$ is the current determined value of the desired transaction, and $V_{n-1}$ is the previous determined value.

It should be appreciated that blocks 140-144 may not be executed during the first iteration of agent negotiation routine 120. Moreover, it may not be necessary to ever execute these blocks in certain applications, particularly where the negotiations occur over a short time frame and/or the market for the desired transaction is such that variations in the value are not expected during negotiations.

After the previous asked and bid prices are adjusted, an optional block 145 may be executed to attempt to detect the real price of the other party with which negotiations are being conducted. A number of methods of detecting the other party's real price may be used, typically utilizing a curve fitting algorithm to extrapolate the other party's previous offers to find the real price, or the best price (relative to agent 100) at which the transaction may be completed.

For example, another party may attempt to approach the real price by reducing the difference between the current offer and the real price by a fraction each time. By tracking each offer, data points over time may be fit to a curve to minimize mean square error or root mean square error, e.g., with the curve represented by:

$$P_n = R + (P_0 - R) \times e^{-cn}$$

$$E = \Sigma(Y_n - P_n)^2$$

where R is the real price, $Y_n$ are the offers, $P_n$ are the values for the offers predicted by the curve, C is a constant, and E is the error. It should be appreciated that R, $P_0$ and c are adjusted to minimize the error.

The above equations assume that the offers are approaching a constant real price. If the real price is changing over time due to appreciation or depreciation or other factors, the equation for $P_n$ may be varied accordingly. Also, the equation assumes that the offers occur at fixed time intervals, and if they do not, the equation may also be varied accordingly by substituting a time variable t for interval variable n. The error may also be minimized based upon either or both of the n and t domains, with the domain giving the least error used in detecting the real price.

Other curve fitting techniques may be used in the alternative. Other equations may also be used to compute the predicted value for $P_n$. In addition, a neural network may be used to predict the other party's real price. For example, it would not be uncommon for another party's negotiation strategy to rely on the offers issued by agent 100 when computing the next offer for the party. In such circumstances, the offers issued by agent 100 may also be used as data points to predict the real price. For example, if agent 100 is a buying agent, the following equations may be used:

$$P_{sn} = R + (P_{s0} - R) \times e^{-cn}$$

$$P_{bn} = R + (R - P_{s0}) \times e^{-cn}$$

$$E = \Sigma(Y_{sn} - P_{sn})^2 + \Sigma(Y_{bn} - P_{bn})^2$$

where R is the real price, $Y_{sn}$ are the sell offers, $Y_{bn}$ are the buy offers, $P_{sn}$ are the values for the sell offers predicted by the curve, $P_{bn}$ are the values for the buy offers predicted by the curve, C is a constant, and E is the error.

On the other hand, if agent 100 is a selling agent, the following equations may be used:

$$P_{bn} = R + (P_{b0} - R) \times e^{-cn}$$

$$P_{sn} = R + (R - P_{b0}) \times e^{-cn}$$

$$E = \Sigma(Y_{sn} - P_{sn})^2 + \Sigma(Y_{bn} - P_{bn})^2$$

where R is the real price, $Y_{sn}$ are the sell offers, $Y_{bn}$ are the buy offers, $P_{sn}$ are the values for the sell offers predicted by the curve, $P_{bn}$ are the values for the buy offers predicted by the curve, C is a constant, and E is the error.

It should be appreciated that the other party's real price may not be detectable, e.g., early in negotiations where sufficient data points have not been obtained, or if a more sophisticated negotiation strategy is being employed. Consequently, the use of the real price in determining the next offer for agent 100 in block 145 may be omitted in these circumstances.

Next, blocks 146 and 148 are executed to calculate (for a buying agent) maximum and minimum bid prices or (for a selling agent) maximum and minimum asked prices. The maximum and minimum prices represent a range of acceptable prices for which an offer may be made by the agent.

For a buying agent, the maximum and minimum bid prices may be selected to be:

$$\max = \mathrm{MIN}(V_n - P, A_{n-1}, R)$$

$$\min = \mathrm{MAX}(V_n - P - M, B_{n-1})$$

where P is the required (or minimum) profit which the agent must obtain to complete the transaction, and M is the negotiating margin used as a starting point for negotiations. Both of these values may be provided as input to the agent and act as constraints on the agent's behavior.

Moreover, it should be noted that the maximum bid price is constrained by the real price, if any, detected for the other party, since at this point it is known that the other party is likely to accept an offer at this price. A margin may also be subtracted from the real price if it is anticipated that the other party may be willing to go below the real price. If the real price is not detected, this term may be dropped from the maximum bid price calculation.

For a selling agent, the maximum and minimum asked prices may be selected to be:

$$\max = \mathrm{MIN}(V_n + P + M, A_{n-1})$$

$$\min = \mathrm{MAX}(V_n + P, B_{n-1}, R).$$

Moreover, it should be noted that the minimum asked price is constrained by the real price, if any, detected for the other party, since at this point it is known that the other party is likely to accept an offer at this price. A margin may also be added to the real price if it is anticipated that the other party may be willing to go above the real price. If the real price is not detected, this term may be dropped from the minimum asked price calculation.

It should be appreciated that on the first iteration of agent negotiation, no previous asked and bid prices exist, and thus, the MIN and MAX functions simplify to their respective remaining terms. On subsequent iterations, however, the range of asked prices decreases, but not below that which would not provide the required profit for the selling agent. Also, the range of bid prices generally increases with each iteration, but never exceeds that which would not provide the required profit for the buying agent.

Next, in block 149, a randomized offer price is calculated for the agent by selecting a random price between the minimum and maximum prices calculated in blocks 146 and 148. For a buying agent, the offer price, or the current bid price, is set to:

$$B_n = \min + \mathrm{random} \times (\max - \min)$$

and for a selling agent, the offer price, or the current asked price, is set to:

$$A_n = \min + \mathrm{random} \times (\max - \min)$$

where random is a random number between 0 and 1.

Therefore, a degree of random noise is added to the offer price computation, thereby hindering detection of the negotiation strategy. Moreover, the range of acceptable prices from which to select is also constrained with each successive iteration. Other pricing strategies may be used in the alternative. For example, the offer price may be selected (for a buying agent) by simply subtracting a fixed amount or a fixed percentage from the last asked price, or (for a selling agent) by adding a fixed amount or fixed percentage to the last bid price. In addition, in lieu of determining a value for the desired transaction, this information could be provided remotely to agent 100 by the agent manager.

Figure 7:
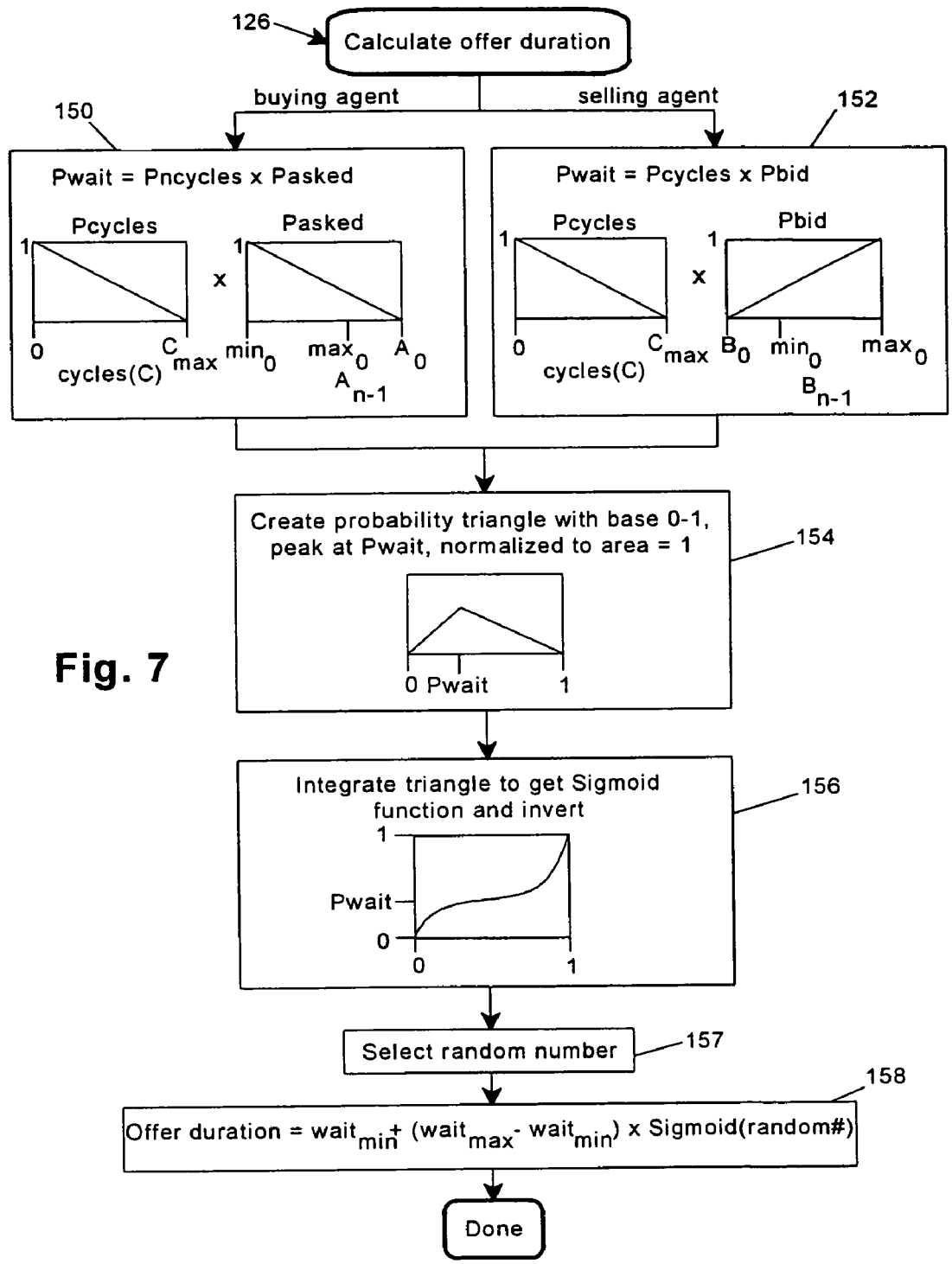
FIG. 7 is a flowchart illustrating the program flow of the calculate offer duration block of FIG. 5.

FIG. 7 illustrates in greater detail the steps in calculate offer duration block 126 of FIG. 5. In this block, probability functions are used to calculate a random wait time constrained by the number of iterations (cycles) in the negotiation, as well as the last offer received from the other party.

For a buying agent, block 150 is first executed to calculate a wait probability value, Pwait, between 0 and 1. As shown in the figure, Pwait is calculated to be the product of two probability functions, Pcycles and Pasked. Pcycles is a function which decreases from 1 to 0 as the number of cycles or iterations increases. For example, where C is the number of cycles, and $C_{max}$ is the maximum number of negotiation cycles permitted, one suitable function may be:

$P\text{cycles}=1-(C/C_{max})$.

Pasked is a function which decreases from 1 to 0 based upon $A_{n-1}$, the last asked price received from the other party. The Pasked function may be replaced with a constant value or separate function during the first iteration when no previous asked price exists. Moreover, the Pasked function may be initialized after the first iteration (cycle C=0) to span the range of the minimum bid price calculated, $\min_0$, to the first asked price from the other party, $A_0$. A suitable function may be:

$P\text{asked}=1-(A_{n-1}-\min_0)/(A_0-\min_0))$.

For a selling agent, block 152 is instead executed to calculate Pwait. In this block, Pwait is calculated to be the product of Pcycles and Pbid. Pcycles may be the same function as above in block 150. Pbid may be a function which increases from 0 to 1 based upon $B_{n-1}$, the last bid price received from the other party. The Pbid function may be replaced with a constant value or separate function during the first iteration when no previous bid price exists. Moreover, the Pbid function may be initialized after the first iteration (cycle C=0) to span the range of the first bid price from the other party, $B_0$, to the maximum asked price calculated, $\max_0$. A suitable function may be:

$P\text{bid}=((B_{n-1}-B_0)/(\max_0-B_0))$.

It should be appreciated that Pwait tends to decrease as the number of cycles increases. Moreover, Pwait tends to be greater depending upon how "good" the other party's offer is relative to the agent (i.e., for buying agents, lower offers from other parties result in higher Pwait values, and vice versa for selling agents). These constraints tend to decrease the offer duration as time increases and/or if the other party does not appear to be converging toward an acceptable price for the agent.

Any of the above functions may utilize different distributions to modify the performance of agent 100. For example, different linear, exponential, logarithmic, etc. functions may be utilized for any of Pwait, Pasked and Pbid, and may be implemented as functions, subroutines, or tables. In addition, none of the functions need be continuous or monotonically increasing or decreasing.

After execution of block 150 or block 152, control passes to block 154 to create a probability triangle with a base from 0 to 1, with a peak at Pwait, and normalized to an area of 1. Next, in block 156, the triangle is integrated to get a Sigmoid function, and the function is subsequently inverted, resulting in a probability distribution that is weighted heavier proximate the value of Pwait. A random number between 0 and 1 is selected in block 157, and this number is input into the derived Sigmoid function in block 158 and used to calculate a random offer duration time between maximum and minimum wait times, $\text{wait}_{max}$ and $\text{wait}_{min}$.

The maximum and minimum wait times are typically selected depending upon the particular circumstances of the market in which the agent interacts (e.g., what is considered an acceptable offer duration in the real estate market is usually different than an acceptable offer duration in the stock market). These times may also be controlled by user input if desired.

It should be appreciated that other probability distributions may be used in the alternative. For example, instead of a probability triangle, other functions which either increase or decrease the distribution around Pwait may be used. In addition, block 126 may simply calculate a random offer duration with equal distribution in the range of acceptable wait times, or a fixed offer duration may be used. Moreover, an infinite offer duration may be used in some applications. However, block 126 as disclosed herein has the advantage of prolonging the offer duration for more promising negotiations, while shortening the duration when a negotiation does not appear to be as productive.

Figure 8:
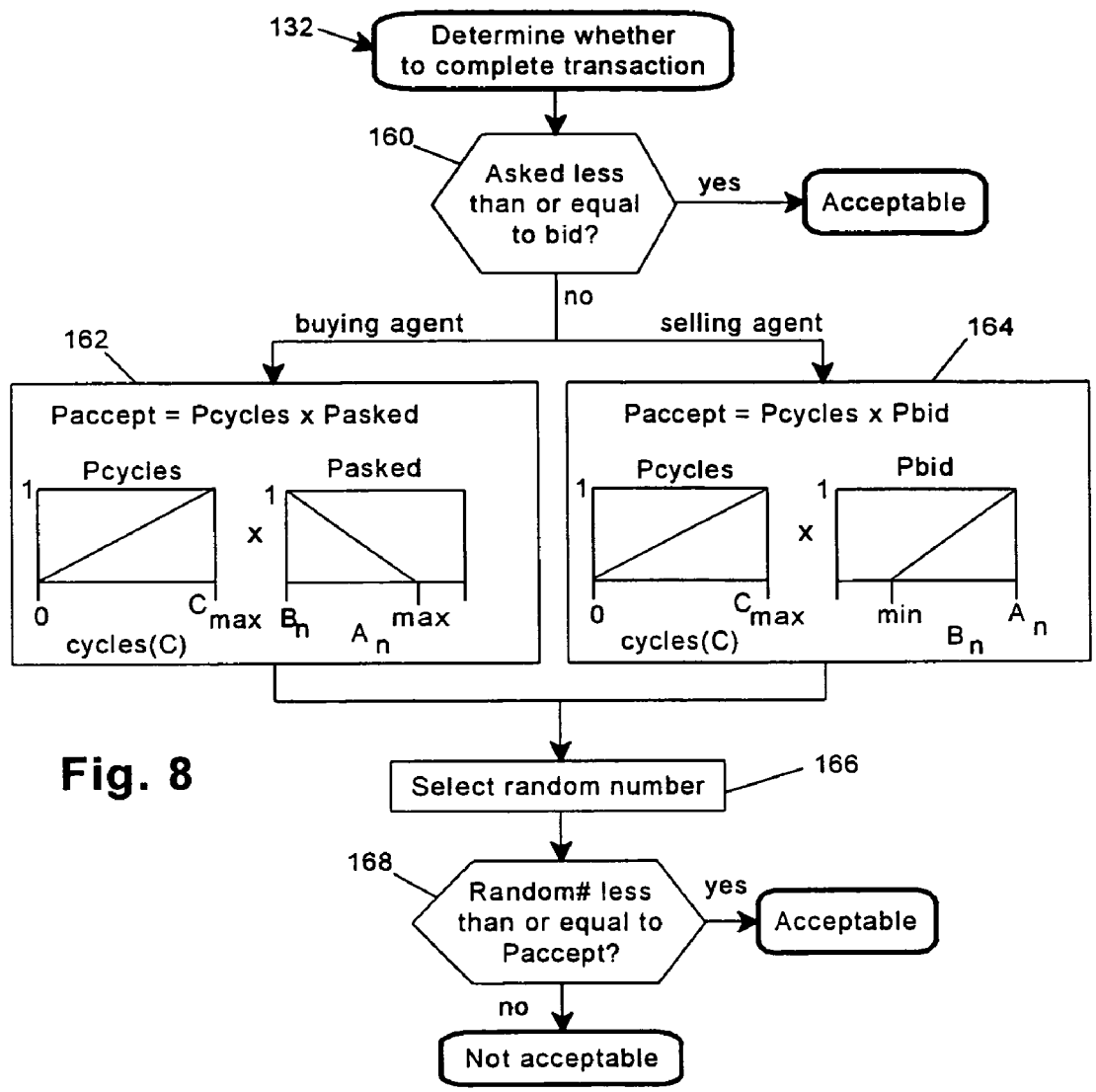
FIG. 8 is a flowchart illustrating the program flow of the complete transaction determination block of FIG. 5.

FIG. 8 illustrates in greater detail the steps in determine whether to complete transaction block 132 of FIG. 5. First, in block 160, the asked price is compared to the bid price. If the asked price is less than or equal to the bid price, this indicates that a suitable price for the transaction has been reached, and accordingly, control is returned to block 134 (FIG. 5) to complete the transaction. If the asked price is still greater than the bid price, control passes to one of blocks 162 or 164, depending upon whether agent 100 is a buying or selling agent.

For a buying agent, block 162 is executed to calculate an accept probability value, Paccept, which is a number between 0 and 1 that represents the probability that agent 100 will accept the other party's last offer irrespective of the fact that its last offer was not fully agreed to. Paccept divides a probability range of 0 to 1 into accept and reject portions, such that a random number selected in this probability range may fall into either the accept or reject portions to control whether the transaction will be completed.

Paccept is calculated as a product of two probability functions, Pcycles and Pasked. Pcycles may be an increasing function between 0 and 1, based upon C, the number of cycles or iterations, and $C_{max}$, the maximum number of cycles permitted in a negotiation:

$P\text{cycles}=(C/C_{max})$.

Pasked may be a function which decreases from 1 to 0 based upon $A_n$, the current asked price received from the other party. The Pasked function may be a function of the current asked price between the current and maximum bid prices, $B_n$ and max, calculated in block 122 of FIG. 6. For example, one suitable function may be:

$P\text{asked}=1-((A_n-B_n)/(\max-B_n))$.

Consequently, the probability that the transaction will be completed increases over time, as well as depending upon how close the current asked and bid prices are. It should be noted that with this probability function the probability of accepting an offer above the max price calculated in block 122 is zero.

For a selling agent, block 164 is instead executed to calculate Paccept as a product of Pcycles and another probability function, Pbid. Pcycles may be identical to that used in block 162. Pbid may be a function which increases from 0 to 1 based upon $B_n$, the current bid price received from the other party. The Pbid function may be a function of the current bid price between the minimum and current asked prices, min and $A_n$, calculated in block 122 of FIG. 6. For example, one suitable function may be:

$P\text{bid}=((B_n-\min)/(A_n-\min))$.

Consequently, the probability that the transaction will be completed increases over time, as well as depending upon how close the current asked and bid prices are. It should also be noted that with this probability function the probability of accepting an offer below the min price calculated in block 122 is zero. Furthermore, it should be appreciated that any of the above functions may utilize different distributions to modify the overall performance of agent 100, e.g., different linear, exponential, logarithmic, etc. functions, whether implemented as functions, subroutines, or tables. In addition, none of the functions need be continuous or monotonically increasing or decreasing.

Next, a random number within a probability range of 0 to 1 is selected in block 166. This number is compared to Paccept in block 168. If the random number is less than or equal to Paccept, the last offer from the other party is accepted and control is passed to block 134 of FIG. 5. If the random number is greater than Paccept, the last offer is rejected, and control passes to block 136 of FIG. 5 to determine whether a counteroffer should be made.

Other rules for completing a transaction may be used in the alternative. For example, a buying agent may be configured to accept any offer that is less than the initial asked price, or to accept only offers for the bid price or lower, or to accept any offer less than the maximum bid price. Similarly, a selling agent may be configured to accept any offer that is greater than the initial bid price, or to accept only offers for the asked price or higher, or to accept any offer greater than the minimum asked price.

Figure 9:
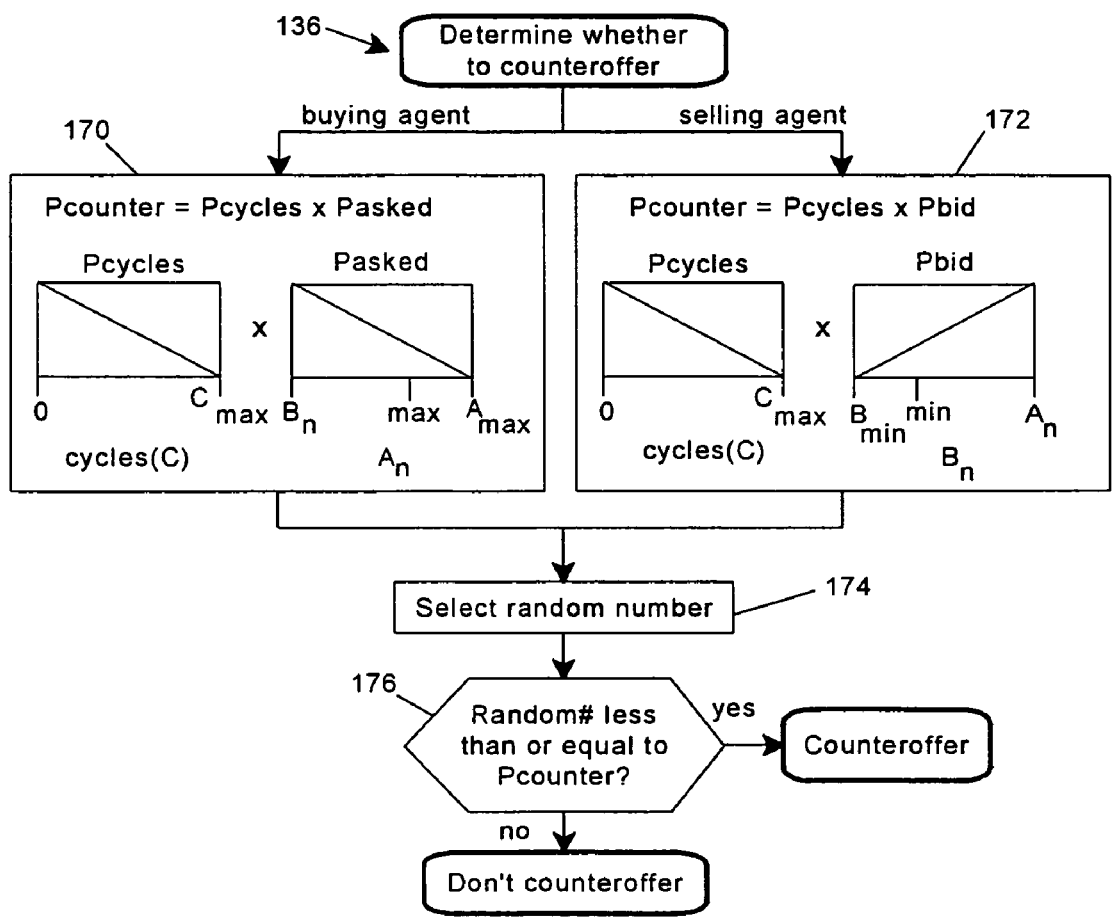
FIG. 9 is a flowchart illustrating the program flow of the counteroffer determination block of FIG. 5.

FIG. 9 illustrates in greater detail the steps in determining whether to counteroffer block 136 of FIG. 5. If agent 100 is a buying agent, block 170 is executed to calculate a counteroffer probability value, Pcounter, which is a number between 0 and 1 that represents the probability that agent 100 will continue negotiations by making a counteroffer. Pcounter divides a probability range of 0 to 1 into counteroffer and no counteroffer portions, such that a random number selected in this probability range may fall into either the portions to control whether a counteroffer will be made.

Pcounter is calculated as a product of two probability functions, Pcycles and Pasked. Pcycles may be a decreasing function between 0 and 1, e.g., as with the Pcycles functions utilized in blocks 150 and 152 of FIG. 7. Pasked may be a function which decreases from 1 to 0 based upon $A_n$, the current asked price received from the other party. For example, one suitable function may be:

$$P\text{asked}=1-((A_n-B_n)/(A_{max}-B_n))$$

where $A_{max}$ is a value that is typically greater than max and that represents the maximum asked price for which a counteroffer should be considered. $A_{max}$ may be, for example, a fixed percentage or constant above max, and may operate, for example, to detect frivolous offers that are beyond what should be expected for reasonable offers from another party.

Consequently, the probability that a counteroffer will be made decreases over time to attempt to limit unproductive negotiations. Also, the probability that a counteroffer will be made increases depending upon how close the current asked and bid prices are.

For a selling agent, block 172 is instead executed to calculate Pcounter as a product of Pcycles and another probability function, Pbid. Pcycles may be identical to that used in block 170. Pbid may be a function which increases from 0 to 1 based upon $B_n$, the current bid price received from the other party. For example, one suitable function for Pbid may be:

$$P\text{bid}=((B_n-B_{min})/(A_n-B_{min}).$$

where $B_{min}$ is a value that is typically less than min and that represents the minimum bid price for which a counteroffer should be considered. $B_{min}$ may be, for example, a fixed percentage or constant below min, and may operate, for example, to detect frivolous offers that are beyond what should be expected for reasonable offers from another party.

As with blocks 150, 152, 162 and 164, any of the above functions in blocks 170 and 172 may utilize different distributions to modify the overall performance of agent 100, e.g., different linear, exponential, logarithmic, etc. functions, whether implemented as functions, subroutines, or tables. In addition, none of the functions need be continuous or monotonically increasing or decreasing.

Next, a random number between 0 and 1 is selected in block 174. This number is compared to Pcounter in block 176. If the random number is less than or equal to Pcounter, a counteroffer will be made, and control is passed to block 138 of FIG. 5. If the random number is greater than Pcounter, no counteroffer will be made, and the negotiation may be terminated.

Other manners of determining whether to make a counteroffer may be used. For example, counteroffers may always be made or never be made. In addition, counteroffers may be made only for a fixed number of cycles. Other alternatives will be apparent to one skilled in the art.

Returning to FIG. 5, block 138 may also be randomized to disguise the negotiation strategy of agent 100. Block 138 may calculate a wait time by retrieving a random number to select between a range of acceptable wait times, specified by min time and max time, each of which may be selected based upon the particular market characteristics within which the agent operates. A suitable function may be:

wait time=min time+(max time−min time)×random#

In the alternative, a constant wait time (even zero) may be used for block 138. In addition, a weighted function, similar to the offer duration calculation, may also be performed to vary the wait time in view of the duration of the negotiation and/or the behavior of the other party.

In general, it should be appreciated that randomization may be performed on any number of operational parameters or characteristics related to the negotiation strategy of agent 100, which effectively hinders the ability of other parties to detect the negotiation strategy of the agent.

Also, a party's unpredictability in negotiations often leads to a more favorable outcome for the party because another party may be less likely to risk missing out on the transaction. For example, if it was known that agent 100 routinely sets an offer duration of five days, another party knowing this may seek better offers for four days, knowing that the original offer will still be available. However, if the offer duration is not known, the other party may simply accept the offer rather than risk losing it.

Moreover, it should be appreciated that any number of operational parameters or characteristics may be constrained in the manner disclosed above based upon a variety of factors including duration of negotiation and behavior of another party. This provides a degree of stability for the agent since less productive negotiations are on the average terminated more quickly to enable the agent to seek more productive negotiations elsewhere. In addition, this may reduce manipulation by other competing parties which may attempt to tie the agent up with frivolous negotiations while the other parties complete transactions to the detriment of the agent.

Figure 10:
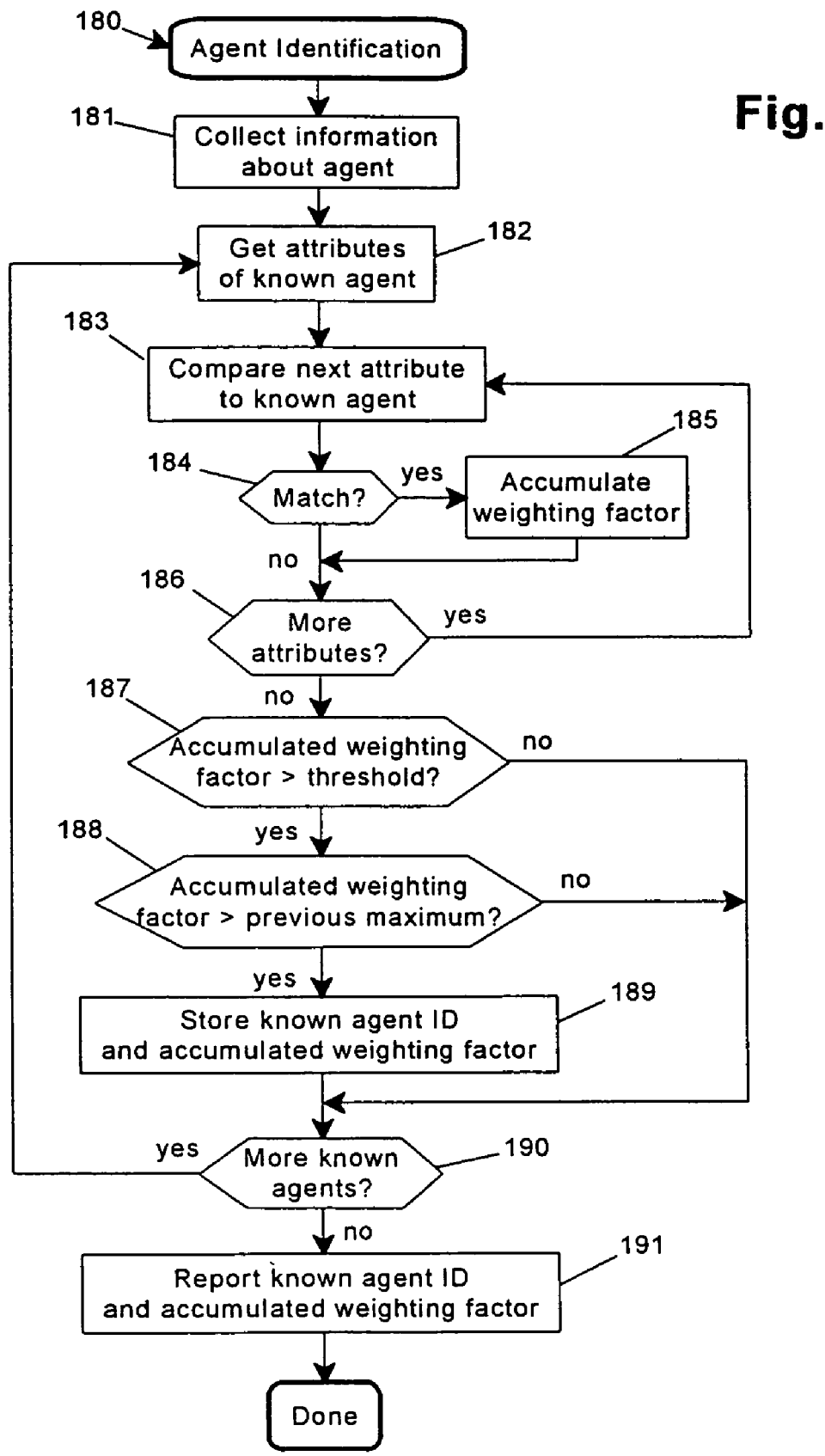
FIG. 10 is a flowchart illustrating an agent identification routine consistent with the invention.

The behavior of agent 100 may also be constrained based upon the identification of another party or the perceived reliability or legitimacy of the other party, with a suitable probability function developed to limit negotiations with unreliable or unknown parties relative to known valid parties. For example, one suitable manner of identifying another agent is illustrated by agent identification routine 180 in FIG. 10. With this routine, a database of known agents may be utilized, with characteristics of an unknown agent compared against the database to match an unknown agent to one of the unknown agents.

Routine 180 begins at block 181 by collecting information about an unknown agent in the form of one or more attributes. For example, routine 180 may attempt to obtain such information on an unknown agent as its name or identification, its client, bank and/or bank account number, its homebase location (e.g., IP address or domain), the name or identification of the agent program, the size of the agent program, where messages and other communications with the agent originate, and/or the pattern of input/output (I/O) compared to CPU cycles for I/O transmissions. Also, routine 180 may attempt to retrieve a credit card number or bank account number from the unknown agent and validate the number. Moreover, the unknown agent may be scanned and compared to other known agents, e.g., comparing the percentage of identical code, determining the language the agent was written in, or searching for unique patterns in much the same manner as a virus checking program.

Whatever attributes are selected for analysis of unknown agents, each factor is assigned a weighting factor such that the sum of all weighting factors equals one. Then, in blocks 182-186, a loop is executed to compare all of the attributes retrieved for the unknown agent against a known agent stored in the database. In block 182, the attributes for a known agent are retrieved, and in blocks 183-186, each attribute for the unknown agent is compared with the corresponding attribute for the known agent. If any attributes match, their corresponding weighting factors are accumulated by block 185.

Next, in block 187, the accumulated weighting factor is compared with a minimum threshold that represents the smallest weighting factor that could indicate a match with a known agent. If the threshold is exceeded, block 188 compares the accumulated weighting factor with the previous maximum for the agent being analyzed (which is initially set to zero). If the accumulated weighting factor exceeds the previous maximum (indicating a more likely match), the identification of the known agent and the accumulated weighting factor are stored as the new maximum in block 189. If either the minimum threshold or the previous maximum are not exceeded, block 189 is skipped.

Next, block 190 determines whether the unknown agent must be compared to any additional known agents in the database. If so, control passes to block 182 to compare the unknown agent to the next known agent in the database. If all known agents have been processed, control passes to block 191 to report the known agent identification and accumulated weighting factor therefor before terminating the routine.

In some embodiments of the invention, some of the records of known agents may represent categories of known agents, where one or only a few attributes are emphasized. This would permit, for example, agents that emanated from a known corrupt domain to be specially handled irrespective of other attributes, among other special situations.

Based upon the information provided by routine 180, a negotiation routine consistent with the invention may be able to classify an unknown agent as valid, corrupt, unknown, or may define a distribution of reliability from valid to corrupt. Based upon this classification, one or more negotiation characteristics may be constrained as above with routine 120, or even terminated immediately in some applications. In addition, the results of a negotiation with a particular agent may be fed back to the database of known agents to modify the reliability of the known agents and thereby expand and improve the database as the agent gains experience. For example, a neural network could be used to generate a reliability rating for an agent based upon the learned behavior of known agents.

Other functionality to the described agent negotiation routine may be made consistent with the invention. Moreover, it should be appreciated that any of the above functionality may be shifted to the agent manager, whereby part or none of the negotiation strategy is resident in the agent, and therefore the agent operates to a greater extent as a intermediary between the agent manager and the other party.

Value Determination

The value of a desired transaction may be determined dynamically by agent 100 in part by combining value estimates from one or more sources of information. Multiple value estimates may be combined, for example, by taking the weighted average of the value estimates, although other methods may be used consistent with the invention. Moreover, as will be discussed in greater detail below, the value of a desired transaction may also be determined at least in part by generating a value estimate from a plurality of related transactions, whether current or past transactions, based upon their proximity to a desired transaction. By comparing one or more characteristics of the desired and related transactions, related transactions that are more similar to the desired transaction are weighted more heavily and therefore are more prominently reflected in the determination of the value estimate.

The valuation process described herein may be performed once for a negotiation, or may be performed as often as once each iteration in a negotiation, to ensure that the latest information is used to obtain the best deal for the client. From the value retrieved from this process, an offer price may be determined by adding or subtracting a negotiating margin and/or required profit margin as appropriate.

Figure 11:
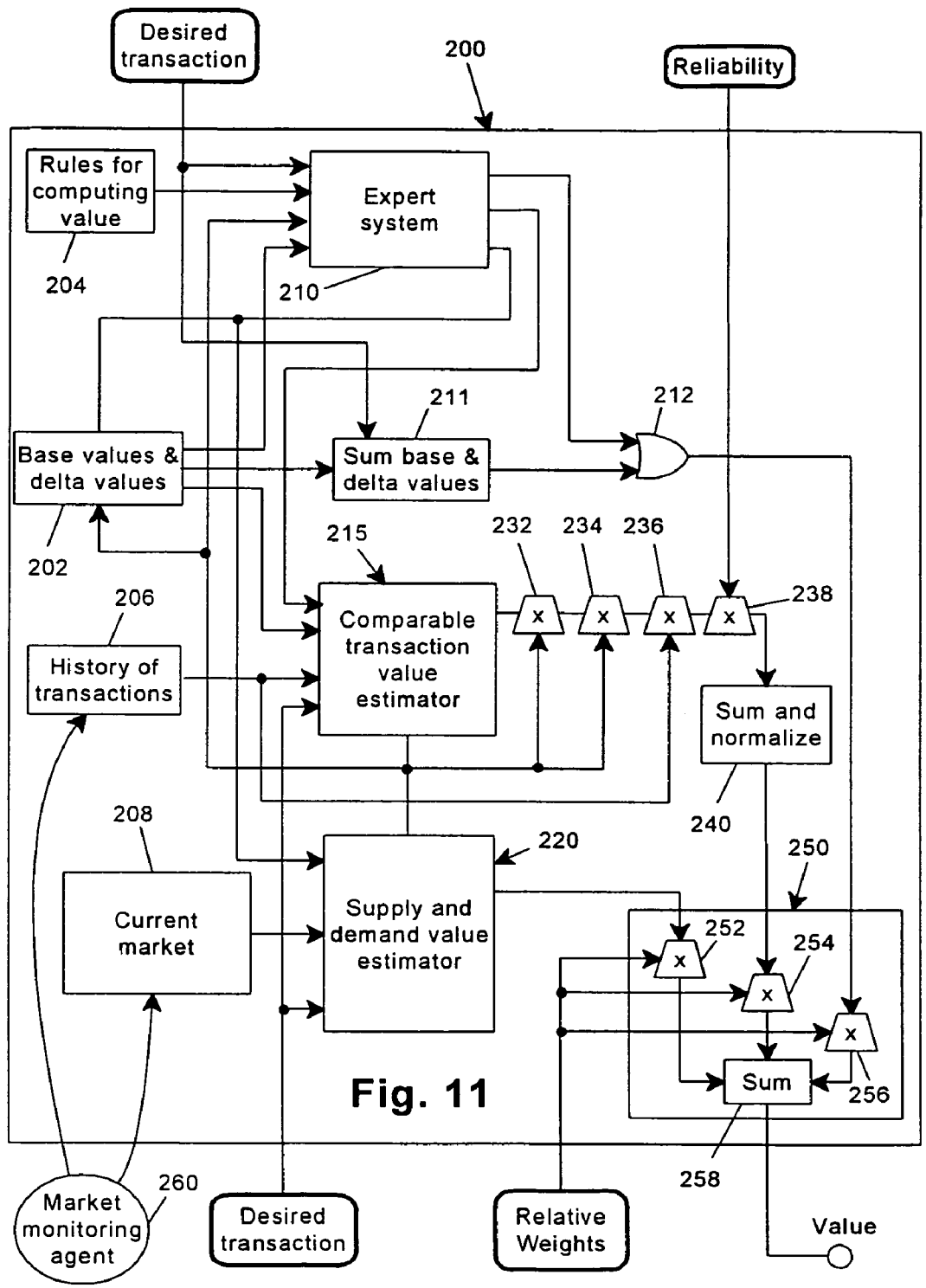
FIG. 11 is a block diagram of the transaction value determination block of FIG. 6.

FIG. 11 illustrates a dynamic value determination module 200, which includes and maintains four databases which provide four types of sources of information for estimating the value of a desired transaction input to the module. As will become more apparent from the discussion below, different databases may have greater applicability to different markets, as well as different goods and services, and thus, the four databases disclosed herein may not be required for all applications. Other types of databases may also be relied upon consistent with the invention.

A first database, base values and delta values database 202, is analogous to an automotive buyers guide, where goods have base values which may be adjusted by delta values depending upon one or more optional features for the particular goods. For example, with an automotive buyers guide, automobiles may have base wholesale and retail prices, with delta prices for adjusting the base prices depending upon mileage and optional equipment.

A second database, rules for computing value database 204, may be used for more complicated applications where values may not be defined with a simple database such as database 202. For example, for real estate, a suitable database may be implemented with rules such as price per square footage, location information and style of house, plus variable additions and subtractions for certain characteristics. Rules-based databases are in general known in the art, and may vary greatly depending upon the particular goods and services, and/or market involved.

A third database, history of transactions database 206, maintains a record of past transactions, including the price of the transaction as well as such descriptive information as the type, quantity, and time of the transaction, as well as the parties involved in the transaction. A fourth database, current market status database 208, maintains current market information, including the current prices (e.g., asked and bid prices) for certain transactions, as well as any limitations on the prices such as quantity and other descriptive information. The current market information includes a record of current transactions, which may include recent completed transactions and/or uncompleted transactions such as outstanding buy and sell offers.

Databases 202 and 204 are often fairly stable and may need only be updated periodically from an external source (e.g., many automobile buyers guides are updated monthly, quarterly or yearly). However, databases 206 and 208 are often more dynamic and may need to be updated almost continuously to provide agent 100 with the latest information possible.

In the illustrated embodiment, updating of databases 206 and 208 is performed via a separate market monitoring agent 260, which may obtain information via maintaining a transaction history for all agents at a home base, snooping on a network such as the Internet, accessing public sources such as libraries, newspaper, financial market or government records, etc. It should be appreciated that market monitoring may also be handled by the agent manager in the client system, or even by agent 100 itself. Market monitoring agent 260 would operate principally as a data mining or information retrieval agent. The operation of such monitoring agents is generally known in the art, and therefore agent 260 will not be described in any greater detail herein.

Based upon the information from databases 202-208, value estimates for a desired transaction may be obtained from one or more of four value estimators. The desired transaction input to module 200 typically includes descriptive information for a transaction such as quantity, features, and other characteristics that describe the transaction in greater detail and permit some value estimates to be specifically tailored for particular transactions.

A first value estimate relies on a sum base and delta values block 211 which retrieves the base and delta values from database 202 that most approximate the desired transaction. Block 211 then sums the retrieved values to arrive at the first value estimate.

A second value estimate relies on an expert system 210 for computing values from the information retrieved from either or both of databases 202, 204. Expert system 210 also may optionally receive a value estimate from either or both of value estimators 215, 220 which are discussed in greater detail below, and may itself provide its value estimate to value estimators 215, 220. The implementation, development and training of an expert system for expert system 210 is in general known in the art, and any number of commercial expert system development packages may be used consistent with the invention. Moreover, the particular configuration of expert system 210 may vary greatly depending upon the market and goods/services for which agent 100 is optimized to negotiate.

Either of the first and second value estimates may be selected at a time as illustrated by OR gate 212, e.g., depending upon the price range and asset category of the goods or services which are the subject of the transaction. In the alternative, both value estimates may be utilized at the same time.

A third value estimate may be obtained using a comparable transaction value estimator 215 which receives input from database 206, as well as from database 202 and expert system 210. In general estimator 215 compares past transactions with the desired transaction and generates for each past transaction (with the exception of any filtered out transactions) an estimated value based upon the proximity of the past transaction to the desired transaction. This is primarily accomplished through standardizing the past transactions in view of the characteristics of the desired transaction. The estimated values are then weighted and summed by blocks 232-240 as discussed below.

Figure 12:
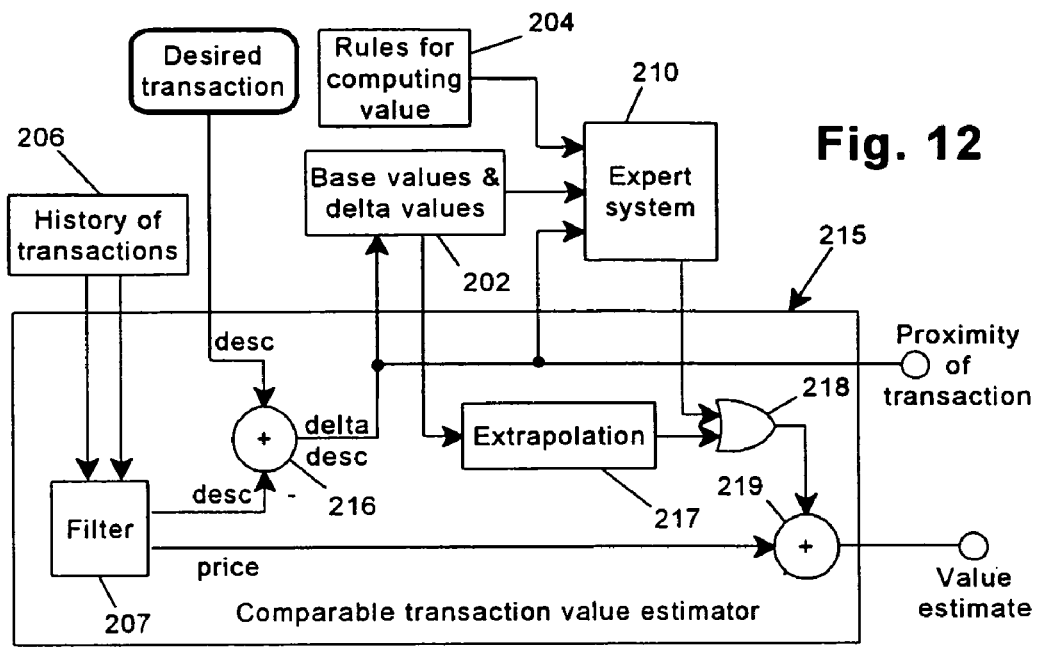
FIG. 12 is a block diagram of the history value estimating block of FIG. 11.

Estimator 215 is illustrated in greater detail in FIG. 12. Descriptions and prices for past transactions are received from database 206 through an optional filter 207 (discussed below). The description for a past transaction is compared to the description of the desired transaction in difference block 216, resulting in one or more delta description signals representative of the proximity or relatedness of the past and desired transactions (e.g., quantity, time, type, etc.). The delta description is supplied to database 202 and expert system 210, which in turn supplies a delta value representative of the descriptive changes between the past and desired transactions. The delta description may also be output as one or more proximity of transaction signals for weighting value estimates.

For example, for the purchase of an automobile, if a past transaction is for an automobile which is identical except for leather seats, a delta value representative of the value of the leather seats may be output to correct the value of the past transaction to remove the value of the leather seats, thereby standardizing the past transaction to the characteristics of the desired transaction. Similar corrections may be made for other distinguishing characteristics between the past and desired transactions.

A delta value is also output by database 202 and passed to an optional extrapolation block 217. Block 217 calculates an alternate delta value to correct for time variations in applications where the value of goods or services varies (i.e., appreciates and/or depreciates) over time (e.g., with stocks, automobiles, real estate, etc.)

For example, block 217 may maintain a record of the prices and times for all past transactions for particular goods or services. Individual records may first be standardized based upon the delta values provided by database 202. From the standardized past transactions, a curve fitting or other routine may be utilized to temporally extrapolate, or develop a trend for the value of the goods over time. The trend may then be used to correct the value of past transactions for current market conditions. As such, any depreciation or appreciation of the goods over time is accounted for in the delta value output from block 217.

The delta value outputs of expert system 210 and extrapolation block 217 are selectively output from an OR gate 218 depending upon the particular application, market and type of goods or services. In the alternative, the two outputs may be weighted and averaged to generate a single delta value. Regardless, the delta value output from gate 218 is passed to summation block 219 and is added to the price for the past transaction to generate a standardized value estimate for the past transaction.

As mentioned above, past transactions may be passed through an optional filter 207 to remove unreliable transactions from the value estimation and thereby hinder manipulation attempts by other parties. This may be performed in addition to, or in lieu of, weighting each past transaction as discussed below.

For example, transactions involving known unreliable or corrupt agents, or involving the agent with which agent 100 is currently negotiating, may be filtered out. In addition, to prevent another party from entering into a number of small transactions to affect the market value of a transaction, low volume transactions below a certain threshold may be omitted. Moreover, open (unaccepted) offers may be filtered out, as may outlying transactions which fall well outside of the trend of past transactions. Particularly for supply and demand value estimator 220 discussed below, open offers which are outside of the trend of past transactions may be discarded. Other inherently less reliable transactions may also be filtered out consistent with the invention.

Returning to FIG. 11, the value estimate for each past transaction in database 206 is weighted by a series of weighting blocks 232, 234, 236 and 238 based upon the proximity or similarity of the past transaction and the desired transaction. Any number of characteristics may be used to weight the transaction, including proximity in time (to emphasize recent transactions), similarity in type (to emphasize transactions for similar features, etc.), quantity (to emphasize larger transactions), and reliability (to de-emphasize transactions with extraneous circumstances).

In the illustrated embodiment, weighting blocks 232 and 234 receive the delta description value outputs from estimator 215 to weight the estimated value depending upon its similarity in type and its proximity in time to the desired transaction. Accordingly, more recent transactions are emphasized, as are transactions that are more similar in type to the desired transaction.

Weighting block 236 receives the quantity of the past transaction to emphasize (weight more heavily) transactions for larger quantities. In addition, weighting block 238 receives a reliability signal related to the reliability of the past transaction. This signal may be obtained, for example, by identifying the agents involved in the past transaction (e.g., with routine 180 discussed above with reference to FIG. 10). Transactions with unreliable agents, or with the same party as is involved in the current negotiation, may be de-emphasized to maintain the integrity of the value estimate.

The weighted value estimates output from blocks 232-238 are summed together and normalized in block 240. The output of this block is a single value estimate based upon all or at least a portion of the past transactions in database 206.

A fourth value estimate may be obtained using a supply and demand value estimator 220 which receives input from database 208 and expert system 210. In general estimator 220 compares current buy and sell offers with the desired transaction and generates for each offer an estimated value based upon any differences between the offer and the desired transaction. This is primarily accomplished through standardizing the offers in view of the characteristics of the desired transaction.

Figure 13:
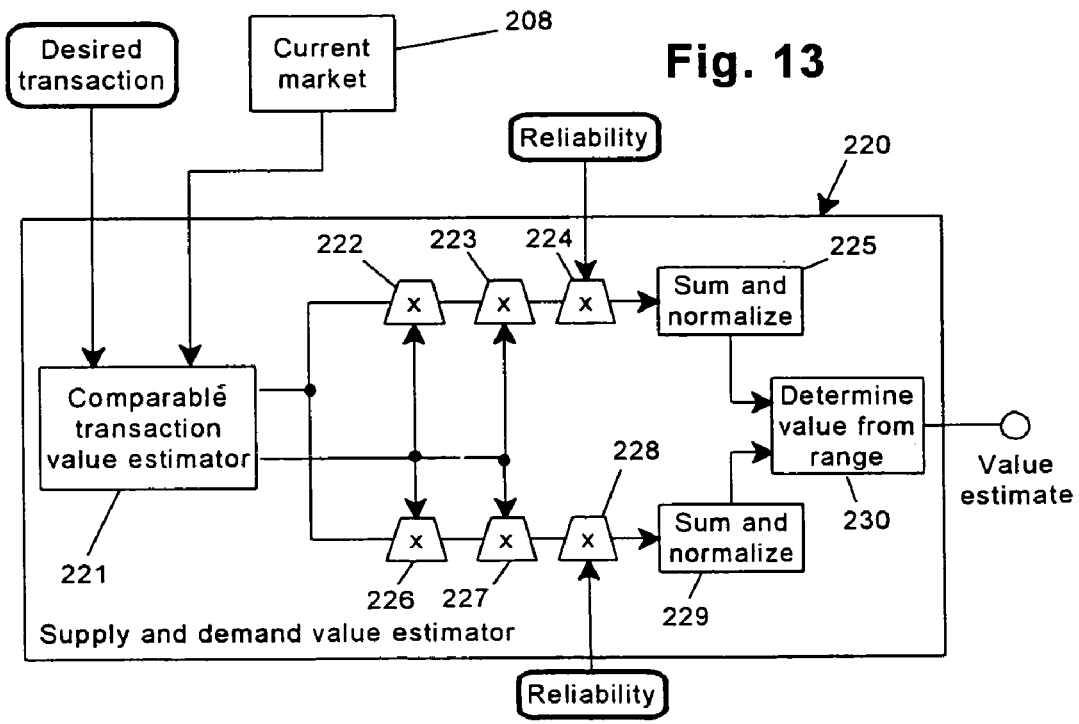
FIG. 13 is a block diagram of the supply and demand value estimating block of FIG. 11.

Estimator 220 is illustrated in greater detail in FIG. 13, where a comparable transaction value estimator 221 receives current sell and buy offers from database 208. The sell and buy offers are separately weighted based upon their proximity to the desired transaction, then are summed and normalized to generate a range from which the value estimate may be obtained.

Estimator 221 is similarly configured to estimator 215, except that current offers are compared to the desired transaction, rather than past transactions. It should be noted that estimator 221 may also be interconnected with database 202 and expert system 210 as with estimator 215; however, the signal paths therefor are omitted in FIG. 13 for clarity.

Sell offers are weighted by a plurality of weighting blocks 222, 223 and 224, then are summed and normalized in block 225. Similarly, buy offers are weighted by a plurality of weighting blocks 226, 227 and 228, then are summed and normalized in block 229. Control over weighting blocks 222 and 226 is provided by estimator 221, which supplies a weighting signal based upon the similarity in type between each offer and the desired transaction, thereby emphasizing more related offers. Control over weighting blocks 223 and 227 is also provided by estimator 221, which supplies a weighting signal based upon the quantity of each offer, thereby emphasizing larger quantity offers. Control over weighting blocks 224 and 228 is provided by a reliability signal, e.g., that provided to block 238 in FIG. 11, to de-emphasize unreliable offers such as from unreliable agents or from the same agent with which negotiations are currently in progress.

The outputs of blocks 225 and 229 typically represent minimum and maximum values for a range, since sell offers are typically lower on average than buy offers. The outputs are provided to a determine value from range block 230 which outputs the value estimate based upon current market conditions. Block 230 may operate in a number of manners to select a value within the range of buy and sell offers. For example, block 230 may take the midpoint of the range, or may take the maximum or minimum of the offers depending upon whether agent 100 is a buying or selling agent. A more favorable price may be selected (e.g., the maximum for a selling agent, and the minimum for a buying agent). In the alternative, since profit and negotiating margins are added in the offer calculation, the less favorable price may be used (e.g., the minimum for a selling agent, and the maximum for a buying agent). In addition, the outputs of blocks 225 and 229 may be weighted according to the number of buy and sell offers, or may be weighted inversely to grant equal weights to buy offers and sell offers. Other manners of selecting the value estimate may be used in the alternative.

A number of modifications to estimator 220 may be made consistent with the invention. For example, the weighted averages of buy and sell offers may be replaced by a minimum of all sell offers and a maximum of all buy offers. In addition, a single weight and normalize step may be used on both the buy and sell offers. Moreover, buy and sell offers may be filtered as above for past transactions to limit the types of offers considered in the estimate calculation.

Returning to FIG. 11, the value estimates output from estimators 215 and 220 and OR gate 212 are supplied to a weighting block 250 including a separate weighting block 252, 254 and 256 for each value estimate. Each weighting block is controlled via a relative weight input to module 200, where the weights to the three blocks 252, 254 and 256 total 1. The weighted value estimates are then summed in block 258 to arrive at the final value estimate.

The relative weights applied to the various value estimates may vary depending upon the particular goods or services and markets. Moreover, it is anticipated that such weights may be determined empirically for different applications, or may be selected by a user. In the alternative, one or more of the value estimates may be disregarded, e.g., if a value estimate differs from the other two value estimates by greater than a certain percentage, or if one or more value estimates is deemed unreliable due to either a small number of comparable transactions or to all transactions having a relatively low similarity.

The value estimates from past transactions and/or current buy and sell offers may be protected against manipulation in a number of manners. By weighting multiple past transactions and/or sell and buy offers, the relative effect of single transactions is minimized. Moreover, transactions for larger quantities are emphasized, thereby minimizing the effects of small transactions that may be made solely for the purpose of affecting the market. Also, through the filtering techniques discussed above, unreliable transactions from known corrupt agents or from the same agent which agent 100 is currently negotiating with may be filtered out, as may transactions and open offers which are well outside of the trend of the market. Furthermore, if the value estimate from past transactions differs greatly from the value estimate from current sell and buy offers (where what a significant difference is may vary based upon the particular market or upon history), the value estimate from the current offers may be thrown out as being unreliable.

It may also be possible to determine a reliability of the value estimate for past transactions and/or current sell and buy offers, e.g., through computing the average weight of the top n transactions used in the value estimate and the number of transactions used in the average. If the number or the weight is less than expected, the reliability of the estimate may be questionable and the behavior of the agent may be modified (e.g., by weighting the value estimate from database 202 or from expert system 210 more heavily). In the alternative, the reliability may be determined by treating the weights of all the transactions or offers as distributions, then using statistical techniques such as average weight, number of points in distribution and standard deviation to determine the reliability.

Various modifications may be made to the illustrated embodiments without departing from the spirit and scope of the invention. For example, any of the above value estimators, weighting blocks and normalizing blocks in module 200 may be implemented using neural networks. Also, a number of variables and functions, such as the maximum and minimum wait times, required profit and negotiating margins, probability functions, and weighting of value estimates, among others, may be controlled by a user.

In addition, a high pass filter may be used in a separate monitoring module in agent 100 to detect strong changes in the market and at least temporarily alter the negotiation strategy of the agent. Transactions are monitored as they occur, and a slope related to the differences in prices between one or more subsequent transactions is calculated in a known manner. Large positive or negative slopes therefore indicate fastly rising or falling prices.

The trend of rising or falling prices is typically monitored over several transactions to ensure that intermittent deviations do not necessarily indicate a volatile market. The filter may be made less susceptible to manipulation by eliminating small transactions for quantities below a predetermined minimum, or by averaging the price over enough small transactions to make the predetermined minimum.

As a result of a volatile market condition, the negotiation strategy of agent 100 may be overridden, e.g., to withdraw pending offers that are now worse for the client than is now available in the market, or to immediately accept pending offers without delay should they be better for the client than is now available in the market. The agent may also withdraw from trading until the volatility decreases. Probability functions may also be modified, for example, to make the agent more or less conservative depending upon market volatility.

A high pass filter may also be used to override any "stop losses" or "stop gains" issued to the agent. A "stop loss" relates to an instruction to sell a product at a certain price below the current market price if the market ever drops to that price. However, in a volatile market where market prices may drop rapidly, the market may drop below this price before the stop loss transaction can be completed. A similar situation may occur for "stop gain" transactions issued when a client is selling short, when a market is rising faster than the stop gain transaction can be completed.

By using the slope calculation from the high pass filter, a market low (or high) point, represented by a change in slope from negative to neutral or positive (or from positive to neutral or negative) over a number of transactions, may be detected and used to lock out stop loss (or stop gain) transactions. This would effectively prevent a sale from being made at the bottom (or top) of the market, when the market trend has reversed. The slope calculation may be performed on a per transaction or per elapsed time basis.

Figure 14:
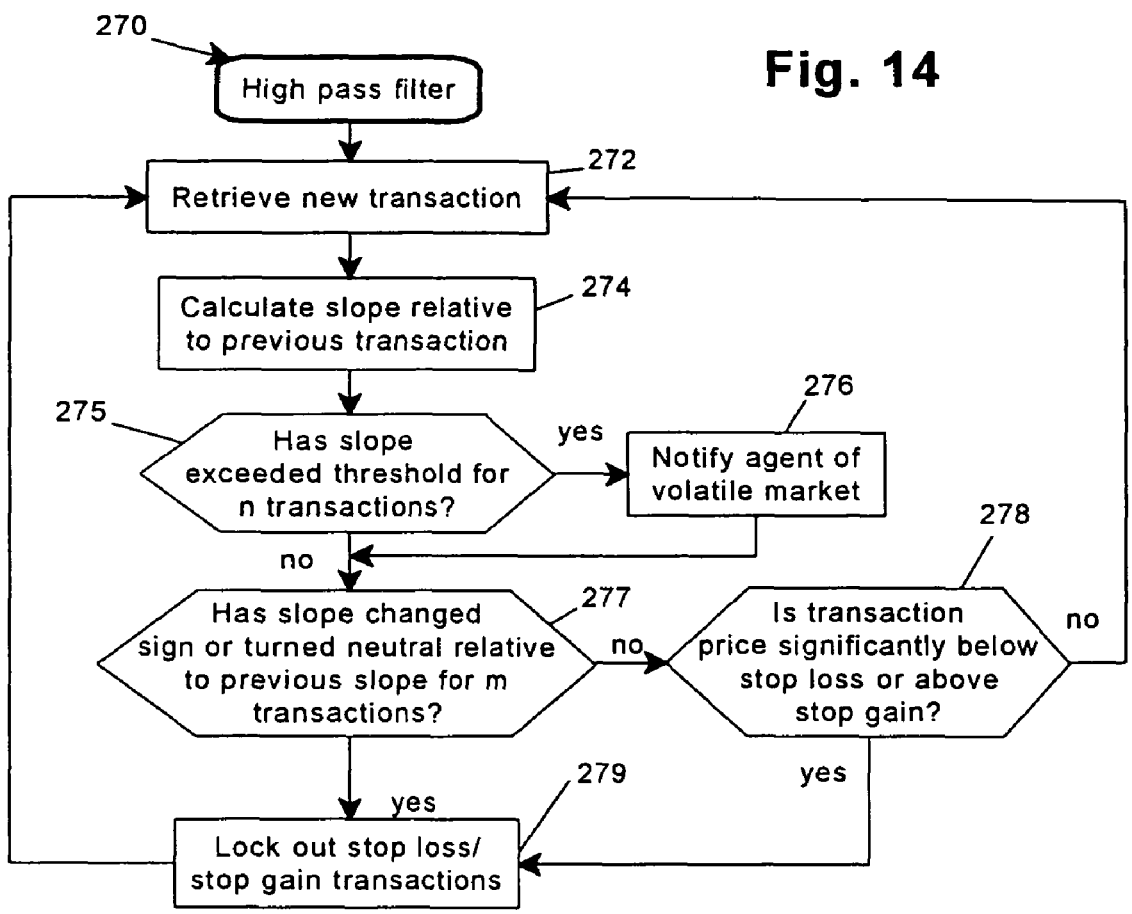
FIG. 14 is a flowchart illustrating a high pass filter consistent with the invention.

For example, one suitable high pass filter 270 having stop loss/gain protection is illustrated in FIG. 14. First, a new transaction is retrieved in block 272. Either of history of transaction database 206 and current market databases 208 may be utilized in this operation, or filter 270 may separately monitor a market, or may receive updates from market monitoring agent 260 (FIG. 11).

The slope relative to a previous transaction is calculated in block 274. Next, block 275 determines whether the slope has exceeded a certain threshold for n transactions, indicating a volatile market condition. Typically, two or more slope calculations are used to minimize transient variations. The threshold will vary depending upon the particular goods/ services and market.

If a volatile market condition has been detected, control passes to block 276 to notify agent 100, whereby the agent negotiation strategy may be modified as discussed above. Control then passes to block 277. If no volatile market condition is detected, control passes directly to block 277.

Block 277 detects whether the slope has changed sign or turned neutral relative to a previous slope over m transactions, indicating that the market has bottomed out (when going from a negative to neutral or positive slope) or crested (when going from a positive to neutral or negative slope). Slope computations over multiple transactions may be considered in this operation to minimize the effects of transient variations. If the slope has changed, the agent may be notified in block 279 to temporarily lock out any stop loss/stop gain transactions. Alternatively, stop loss transactions may be locked out only in response to a negative to positive or neutral slope change, and stop gain transactions may be locked out only in response to a contrary change. After the transactions are locked out, control returns to block 272 to process the next transaction.

Returning to block 277, if the slope has not changed, control passes to block 278 to determine whether the transaction price has fallen significantly below the stop loss price, or has risen significantly above the stop gain price. If so, control passes to block 279 to temporarily lock out any stop loss/stop gain transactions, as discussed above. If not, control returns to block 272 to process the next transaction. It should be appreciated that block 278 may also be implemented by utilizing a range of prices for the stop loss and/or stop gain.

Other modifications will be apparent to one skilled in the art. Therefore, the invention lies solely in the claims hereinafter appended.

What is claimed is:

1. A method of identifying an unknown party interacting with an intelligent agent, the method comprising, in a computer that includes at least one processor, executing a program to perform the steps of:

determining a plurality of attributes related to the unknown party, wherein the unknown party is a party other than a client that has delegated at least one task to the intelligent agent;

comparing the plurality of attributes for the unknown party with attributes related to a plurality of known parties; and identifying the unknown party as the known party having attributes that most closely match those of the unknown party;

wherein the unknown party is an intelligent agent configured to conduct electronic transactions, wherein the plurality of attributes is selected from the group consisting of an agent name, a client name, a bank name, a bank account number, a credit card number, a homebase location, an agent program name, or a location or name of a source with which the unknown party communicates, wherein each of the plurality of attributes has a weighting factor associated therewith, wherein the comparing step calculates an accumulated weighting factor for each known party by summing the weighting factors of the attributes of the known party which match those of the unknown party, and wherein the identifying step identifies the unknown party as the known party with the largest accumulated weighting factor.

2. The method of claim 1, wherein the comparing step includes the step of accessing a database including a plurality of records, each record associated with a known party and including the plurality of attributes related to the known party.

3. The method of claim 1, wherein the determining step includes the step of scanning program code for the unknown party to determine attributes thereof.

4. An apparatus for identifying an unknown party interacting with an intelligent agent, comprising:

at least one processor;

a database including a plurality of records, each record associated with a known party and including a plurality of attributes related to the known party; and an identification module, coupled to the database, the identification module comprising instructions configured upon execution by the at least one processor to compare a plurality of attributes for the unknown party with those of each known party and to identify the unknown party as the known party having attributes that most closely match those of the unknown party, wherein the unknown party is a party other than a client that has delegated at least one task to the intelligent agent;

wherein the unknown party is an intelligent agent configured to conduct electronic transactions, wherein the plurality of attributes are selected from the group consisting of an agent name, a client name, a bank name, a bank account number, a credit card number, a homebase location, an agent program name, or a location or name of a source with which the unknown party communicates, wherein each of the plurality of attributes has a weighting factor associated therewith, and wherein the identification module is configured to calculate an accumulated weighting factor for each known party by summing the weighting factors of the attributes of the known party which match those of the unknown party, and to identify the unknown party as the known party with the largest accumulated weighting factor.

5. A program product comprising:

a recordable computer readable medium; and a program stored on the recordable computer readable medium and configured upon execution to perform a method of identifying an unknown party interacting with an intelligent agent, the method comprising the steps of:

determining a plurality of attributes related to the unknown party, wherein the unknown party is a party other than a client that has delegated at least one task to the intelligent agent;

comparing the plurality of attributes for the unknown party with attributes related to a plurality of known parties; and identifying the unknown party as the known party having attributes that most closely match those of the unknown party;

wherein the unknown party is an intelligent agent configured to conduct electronic transactions, wherein the plurality of attributes are selected from the group consisting of an agent name, a client name, a bank name, a bank account number, a credit card number, a homebase location, an agent program name, or a location or name of a source with which the unknown party communicates, wherein each of the plurality of attributes has a weighting factor associated therewith, and wherein the program is configured to calculate an accumulated weighting factor for each known party by summing the weighting factors of the attributes of the known party which match those of the unknown party, and to identify the unknown party as the known party with the largest accumulated weighting factor.

6. The apparatus of claim 4, wherein the identification module is configured to scan program code for the unknown party to determine attributes thereof.

7. The program product of claim 5, wherein the program is configured to access a database including a plurality of records, each record associated with a known party and including the plurality of attributes related to the known party.

8. The program product of claim 5, wherein the program is configured to scan program code for the unknown party to determine attributes thereof.

9. A method of identifying an unknown party interacting with a first intelligent agent, the method comprising, in a computer that includes at least one processor, executing a program to perform the steps of:

determining a plurality of attributes related to the unknown party, wherein the unknown party is a second intelligent agent interacting with the first intelligent agent;

comparing the plurality of attributes for the unknown party with attributes related to a plurality of known parties; and identifying the unknown party as the known party having attributes that most closely match those of the unknown party;

wherein the unknown party is configured to conduct electronic transactions, wherein the plurality of attributes is selected from the group consisting of an agent name, a client name, a bank name, a bank account number, a credit card number, a homebase location, an agent program name, or a location or name of a source with which the unknown party communicates, wherein each of the plurality of attributes has a weighting factor associated therewith, wherein the comparing step calculates an accumulated weighting factor for each known party by summing the weighting factors of the attributes of the known party which match those of the unknown party, and wherein the identifying step identifies the unknown party as the known party with the largest accumulated weighting factor.

10. A method of identifying an unknown party interacting with an intelligent agent, the method comprising, in a computer that includes at least one processor, executing a program to perform the steps of:

determining a plurality of attributes related to the unknown party;

comparing the plurality of attributes for the unknown party with attributes related to a plurality of known parties;

identifying the unknown party as the known party having attributes that most closely match those of the unknown party; and controlling a behavior of the intelligent agent when interacting with the unknown party based upon the identification of the unknown party;

wherein the unknown party is an intelligent agent configured to conduct electronic transactions, wherein the plurality of attributes is selected from the group consisting of an agent name, a client name, a bank name, a bank account number, a credit card number, a homebase location, an agent program name, or a location or name of a source with which the unknown party communicates, wherein each of the plurality of attributes has a weighting factor associated therewith, wherein the comparing step calculates an accumulated weighting factor for each known party by summing the weighting factors of the attributes of the known party which match those of the unknown party, and wherein the identifying step identifies the unknown party as the known party with the largest accumulated weighting factor.

11. The method of claim 10, wherein controlling the behavior of the intelligent agent includes controlling a negotiation strategy used by the intelligent agent when conducting an electronic transaction with the unknown party.

12. The method of claim 10, wherein identifying the unknown party includes identifying the unknown party as being untrustworthy, and wherein controlling the behavior of the intelligent agent includes modifying the behavior of the intelligent agent to account for increased risk posed by the unknown party and continuing to interact with the unknown party using the modified behavior.

* * * * *